(12) United States Patent
Kurosawa et al.

(10) Patent No.: US 7,801,676 B2
(45) Date of Patent: Sep. 21, 2010

(54) METHOD AND APPARATUS FOR DISPLAYING A MAP

(75) Inventors: Takeshi Kurosawa, Iwaki (JP); Mizuki Yuasa, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1492 days.

(21) Appl. No.: 11/126,952

(22) Filed: May 11, 2005

(65) Prior Publication Data

US 2005/0261826 A1 Nov. 24, 2005

(30) Foreign Application Priority Data

May 12, 2004 (JP) ............................. 2004-141879

(51) Int. Cl.
*G01C 21/30* (2006.01)
*G01C 21/32* (2006.01)
(52) U.S. Cl. ................... 701/209; 701/213; 701/211; 701/212; 701/208; 340/995.24; 340/995.15; 340/815.4; 345/634
(58) Field of Classification Search .............. 701/208, 701/201, 209, 212–213; 340/995.1, 995.15, 340/995.14, 815.4; 365/48; 345/30
See application file for complete search history.

(56) References Cited

U.S. PATENT DOCUMENTS

| | | | | |
|---|---|---|---|---|
| 3,857,709 A | * | 12/1974 | Domeshek | 430/22 |
| 4,065,309 A | * | 12/1977 | Domeshek | 430/199 |
| 5,121,326 A | * | 6/1992 | Moroto et al. | 701/212 |
| 5,161,886 A | * | 11/1992 | De Jong et al. | 701/209 |
| 5,200,902 A | * | 4/1993 | Pilley | 701/120 |
| 5,371,678 A | * | 12/1994 | Nomura | 701/210 |
| 5,377,102 A | * | 12/1994 | Nishiishigaki | 702/5 |
| 5,742,924 A | * | 4/1998 | Nakayama | 701/208 |
| 5,757,290 A | * | 5/1998 | Watanabe et al. | 340/995.14 |

(Continued)

FOREIGN PATENT DOCUMENTS

CN 1696612 A * 11/2005

(Continued)

OTHER PUBLICATIONS

Remote Monitoring and Automatic Navigation System for Agricultural Vehicles Based on WLAN; Zhou Jianjun et al.; Wireless Communications, Networking and Mobile Computing, 2008. WiCOM '08. 4th International Conference on; Digital Object Identifier: 10.1109/WiCom.2008.721; Publication Year: 2008, pp. 1-4.*

(Continued)

*Primary Examiner*—Cuong Nguyen
(74) *Attorney, Agent, or Firm*—Brinks Hofer Gilson & Lione

(57) ABSTRACT

A navigation apparatus for displaying a map that includes building symbols representing buildings. The navigation apparatus includes a map-drawing unit that draws the map of an area from map data on shapes and positions of the building symbols at a selected map scale and a displaying unit that displays the drawn map. In the navigation apparatus in a nighttime-map displaying mode, the map-drawing unit draws the entirety of each building symbol in a bright color to generate the map when the map scale exceeds a predetermined threshold and draws part of the building symbol in a bright color to generate the map when the map scale does not exceed the predetermined threshold.

15 Claims, 15 Drawing Sheets

U.S. PATENT DOCUMENTS

| | | | | |
|---|---|---|---|---|
| 5,793,310 | A * | 8/1998 | Watanabe et al. | 340/995.14 |
| 5,796,350 | A * | 8/1998 | Fuse | 340/815.75 |
| 5,862,498 | A * | 1/1999 | Koyanagi et al. | 701/28 |
| 5,862,510 | A * | 1/1999 | Saga et al. | 701/211 |
| 5,884,218 | A * | 3/1999 | Nimura et al. | 701/208 |
| 5,917,436 | A * | 6/1999 | Endo et al. | 340/995.14 |
| 5,995,106 | A * | 11/1999 | Naughton et al. | 715/854 |
| 6,011,494 | A * | 1/2000 | Watanabe et al. | 340/995.14 |
| 6,012,014 | A * | 1/2000 | Koyanagi et al. | 701/208 |
| 6,035,253 | A * | 3/2000 | Hayashi et al. | 701/211 |
| 6,064,322 | A * | 5/2000 | Ohira | 340/995.18 |
| 6,144,920 | A * | 11/2000 | Mikame | 701/212 |
| 6,278,383 | B1 * | 8/2001 | Endo et al. | 340/995.14 |
| 6,405,129 | B1 * | 6/2002 | Yokota | 701/208 |
| 6,421,604 | B1 * | 7/2002 | Koyanagi et al. | 701/208 |
| 6,445,999 | B1 | 9/2002 | Nakamura | |
| 6,493,630 | B2 * | 12/2002 | Ruiz et al. | 701/208 |
| 6,525,690 | B2 * | 2/2003 | Rudow et al. | 342/357.13 |
| 6,603,407 | B2 * | 8/2003 | Endo et al. | 340/995.14 |
| 6,621,494 | B2 * | 9/2003 | Matsuoka et al. | 345/427 |
| 6,756,919 | B2 * | 6/2004 | Endo et al. | 340/995.14 |
| 6,801,638 | B1 * | 10/2004 | Janssen et al. | 382/104 |
| 6,904,360 | B2 * | 6/2005 | Pechatnikov et al. | 701/208 |
| 7,176,924 | B2 * | 2/2007 | Wilkinson | 345/440 |
| 7,225,077 | B2 * | 5/2007 | Kouchiyama | 701/209 |
| 2001/0028350 | A1 * | 10/2001 | Matsuoka et al. | 345/427 |
| 2001/0039474 | A1 * | 11/2001 | Hayashi et al. | 701/208 |
| 2002/0010544 | A1 * | 1/2002 | Rudow et al. | 701/213 |
| 2002/0011941 | A1 * | 1/2002 | Endo et al. | 340/995 |
| 2002/0049532 | A1 * | 4/2002 | Nakamura | 701/208 |
| 2002/0128774 | A1 * | 9/2002 | Takezaki et al. | 701/211 |
| 2002/0149604 | A1 * | 10/2002 | Wilkinson | 345/643 |
| 2003/0018427 | A1 * | 1/2003 | Yokota et al. | 701/208 |
| 2003/0023374 | A1 * | 1/2003 | Shimabara | 701/212 |
| 2003/0197626 | A1 * | 10/2003 | Endo et al. | 340/995.1 |
| 2003/0201914 | A1 * | 10/2003 | Fujiwara et al. | 340/995.24 |
| 2004/0021584 | A1 * | 2/2004 | Hartz et al. | 340/995.24 |
| 2004/0030493 | A1 * | 2/2004 | Pechatnikov et al. | 701/208 |
| 2004/0039934 | A1 * | 2/2004 | Land et al. | 713/200 |
| 2005/0177303 | A1 | 8/2005 | Han | |
| 2005/0261826 | A1 * | 11/2005 | Kurosawa et al. | 701/208 |
| 2006/0022214 | A1 * | 2/2006 | Morgan et al. | 257/99 |
| 2006/0033738 | A1 * | 2/2006 | Wilkinson | 345/440 |
| 2006/0129933 | A1 * | 6/2006 | Land et al. | 715/723 |

FOREIGN PATENT DOCUMENTS

| | | | |
|---|---|---|---|
| JP | 4-048706 | * | 3/1992 |
| JP | 6-033182 | * | 2/1994 |
| JP | 6-033182 | * | 8/1994 |
| JP | 7-037054 | * | 2/1995 |
| JP | 09-127862 | | 5/1997 |
| JP | 09-212512 | | 8/1997 |
| JP | 2000-283784 | | 10/2000 |
| JP | 2001-033257 | * | 2/2001 |
| JP | 2002-304641 | | 10/2002 |
| JP | 2003329469 A | * | 11/2003 |
| JP | 2005326154 A | * | 11/2005 |
| WO | PCT/JP88/01299 | * | 12/1988 |

OTHER PUBLICATIONS

Stereo-Based Tree Traversability Analysis for Autonomous Off-Road Navigation; Huertas, A. et al.; Application of Computer Vision, 2005. WACV/Motions '05 vol. 1. Seventh IEEE Workshops on; Vol. 1; Digital Object Identifier: 10.1109/ACVMOT.2005.111; Publication Year: 2005, pp. 210-217.*

Pervasive Scene Map on Wireless Devices for City Navigation; Jiang Yu Zheng et al.; Network-Based Information Systems, 2009. NBIS '09. International Conference on; Digital Object Identifier: 10.1109/NBiS.2009.20; Publication Year: 2009, pp. 75-82.*

Cell link: Real-time data tracking of automobiles via cell phones; Huasong Cao et al.; Consumer Electronics (ICCE), 2010 Digest of Technical Papers International Conference on; Digital Object Identifier: 10.1109/ICCE.2010.5418689; Publication Year: 2010, pp. 305-306.*

Global urban localization based on road maps; Guivant, J. et al.; Intelligent Robots and Systems, 2007. IROS 2007. IEEE/RSJ International Conference on; Digital Object Identifier: 10.1109/IROS.2007.4399178; Publication Year: 2007, pp. 1079-1084.*

Correspondence Transfer for the Registration of Multimodal Images; Zhao Yi et al.; Computer Vision, 2007. ICCV 2007. IEEE 11th International Conference on; Digital Object Identifier: 10.1109/ICCV.2007.4409074; Publication Year: 2007, pp. 1-8.*

Outdoor Navigation of a Mobile Robot Using Differential GPS and Curb Detection; Seung-Hun Kim et al.; Robotics and Automation, 2007 IEEE International Conference on; Digital Object Identifier: 10.1109/ROBOT.2007.364000; Publication Year: 2007, pp. 3414-3419.*

Presenting nighttime imagery in daytime colours; Hogervorst, M.A. et al.; Information Fusion, 2008 11th International Conference on; Digital Object Identifier: 10.1109/ICIF.2008.4632280; Publication Year: 2008, pp. 1-8; Digital Object Identifier: 10.1109/MIM.2004.1288779; Publication Year: 2004, pp. 56-60.*

Office Action and Notice of References Cited for U.S. Appl. No. 11/080,366, dated Apr. 9, 2009, (9 pages).

Office Action and Notice of References Cited for U.S. Appl. No. 11/080,366, dated Sep. 18, 2008, (11 pages).

Japanese Office Action (Notification of Reasons for Refusal) in Japanese Application No. 2004-141879, dated Sep. 29, 2009, with English language translation, 8 pages.

* cited by examiner

METHOD AND APPARATUS FOR DISPLAYING A MAP

BACKGROUND OF THE INVENTION

1. Field of the Invention

The present invention relates to navigation apparatuses that are mounted in vehicles and that guide users driving vehicles, and relates to methods for displaying maps using the same.

2. Description of the Related Art

A navigation apparatus mounted in a vehicle may guide a user driving a vehicle by receiving a user request for setting a destination, determining a recommended route to the destination, and displaying this route and a mark showing the current position on a map of an area including the current position. A known method for displaying a map in the navigation apparatus is disclosed in, for example, Japanese Unexamined Patent Application Publication No. 2000-283784. In this method, when the scale of the map is large, the map includes symbols showing, for example, roads and shapes of buildings. When the scale is small, the map includes symbols showing roads superimposed on a satellite geographical picture.

In this method, when a satellite picture shot at nighttime is displayed during nighttime driving, a screen displaying an urban area is filled with light and appears white at a small map scale, thereby impairing visibility and clearness of the screen. Alternatively, light of buildings may be shown by highlighting symbols showing shapes of building on a map to represent nighttime. Even in this case, a screen displaying an urban area including a large number of buildings is filled with light and appears white at a small map scale.

Moreover, in this method, a realistic display using satellite pictures at a large map scale disadvantageously requires a large capacity for storing these satellite pictures having a large data volume in the navigation apparatus.

SUMMARY OF THE INVENTION

Accordingly, it is an object of the present invention to display a map representing a nighttime view having high visibility and high clearness. To achieve this object, an embodiment of the present invention provides a navigation apparatus for displaying a map that includes building symbols representing buildings. The navigation apparatus includes a map-drawing unit that draws the map of an area from map data on shapes and positions of the building symbols at a selected map scale, and a displaying unit that displays the drawn map. In the navigation apparatus in a nighttime-map displaying mode, the map-drawing unit draws the entirety of each building symbol in a bright color to generate the map when the map scale exceeds a predetermined threshold, or draws part of the building symbol in a bright color to generate the map when the map scale does not exceed the predetermined threshold.

In this navigation apparatus, the entirety of the building symbol is drawn in a bright color on the map to represent a night view at a large scale. On the other hand, the part of the building symbol is drawn in a bright color on the map to represent a night view at a small scale, and the map is not filled with light spots, thereby ensuring high visibility. Thus, a night view having high visibility and high clearness can be presented regardless of the map scale.

In the navigation apparatus, the map data may include a position data field representing at least one representative point in each building symbol, and the map-drawing unit may draw a bright symbol on a position indicated by the position data field when the map scale does not exceed the predetermined threshold in a nighttime-map displaying mode. In this arrangement, the display of city lights at a small scale may utilize data of the representative point in the building symbol in the map master data and thus require a relatively small capacity for storing the map data.

In the navigation apparatus, the map-drawing unit may calculate the position of at least one representative point in each building symbol and may draw a bright symbol on the calculated position when the map scale does not exceed the predetermined threshold in a nighttime-map displaying mode. In this arrangement, displaying city lights at a small scale does not need data specific to city lights in the map master data.

In the navigation apparatus, the map-drawing unit may draw the part of the building symbol after a reduction in the area ratio of the part to the entirety when the map scale does not exceed the predetermined threshold in a nighttime-map displaying mode. In this arrangement, the area ratio of the bright part to the entirety of the building symbol decreases as the scale decreases. Thus, visibility and clearness of the map can be optimized depending on the scale.

In the navigation apparatus, the map-drawing unit may draw the part of the building symbol with a smaller area ratio of the part to the entirety as the number of building symbols included in individual predetermined regions in both the map and an associated area increases when the map scale does not exceed the predetermined threshold in a nighttime-map displaying mode.

In this navigation apparatus, the area ratio of the bright part to the entirety of the building symbol is reduced for the regions having a large building density. Thus, the map is not filled with light spots, thereby ensuring high visibility. The area ratio of the bright part to the entirety of the building symbol is increased for the regions having a small building density. Thus, light spot symbols each having a large bright area can be drawn on the map. In the navigation apparatus, the representative point in the building symbol may be at least one vertex, the central point, or the center of mass.

In the navigation apparatus, when the map-drawing unit draws a bird's-eye view obtained by virtually viewing an area covered by the map from a viewpoint in midair, the map-drawing unit may draw the entirety or part of the building symbol that has a lower brightness as the position of the building symbol shifts to the top of the map under a condition that the map scale does not exceed the predetermined threshold in a nighttime-map displaying mode. In this case, the map-drawing unit draws the entirety or part of the building symbol at a size that decreases as the position of the building symbol shifts to the top of the map.

In this arrangement, the lights of buildings in regions distant from the viewpoint can be displayed in, for example, the bird's-eye view at a small size and in a dark color. Thus, a realistic display of a nighttime view can be achieved.

Embodiments also provides a navigation apparatus for displaying a map. The navigation apparatus includes a map-drawing unit that draws a bird's-eye view of a display area on the map, a land-area calculating unit that calculates a land area of a boundary corresponding to the horizon of the bird's-eye view, a map-image generating unit that draws a night-sky image representing city lights only on the land area to generate a map image in a nighttime-map displaying mode, and a displaying unit that displays the generated map image. In this navigation apparatus, the city lights in distant regions are displayed only for the land area of horizon of the bird's-eye view. Thus, the city lights are not displayed for, e.g., a sea area where the city lights do not exist, thereby achieving a realistic display of a nighttime view having high clearness.

Other embodiments also provides a navigation apparatus for displaying a map with reference to map data. The navigation apparatus includes a map-drawing unit that draws a bird's-eye view obtained by virtually viewing a display area on the map from a viewpoint in midair above a predetermined reference position in the display area; a building-density calculating unit that estimates the building densities of individual viewing angle regions obtained by dividing an area extending from the display area in the viewing direction of the display area in a nighttime-map displaying mode; a map-image generating unit that adjusts emphasis levels for displaying the respective viewing angle regions and that draws a night-sky image representing city lights at these emphasis levels on portions of the horizon to generate a map image in a nighttime-map displaying mode, the emphasis levels increasing as the estimated building densities of the respective viewing angle regions increase, the portions corresponding to the respective viewing angle regions; and a displaying unit that displays the generated map image.

In this navigation apparatus, the city lights appearing on the horizon of the bird's-eye view can be displayed for the individual portions of the horizon at respective emphasis levels in response to the building densities in the viewing angle regions corresponding to the portions of the horizon. The emphasis level can be increased as the building density in each viewing angle region increases. Thus, a realistic display of a nighttime view having high clearness can be achieved.

DESCRIPTION OF THE PREFERRED EMBODIMENTS

Figure 1:
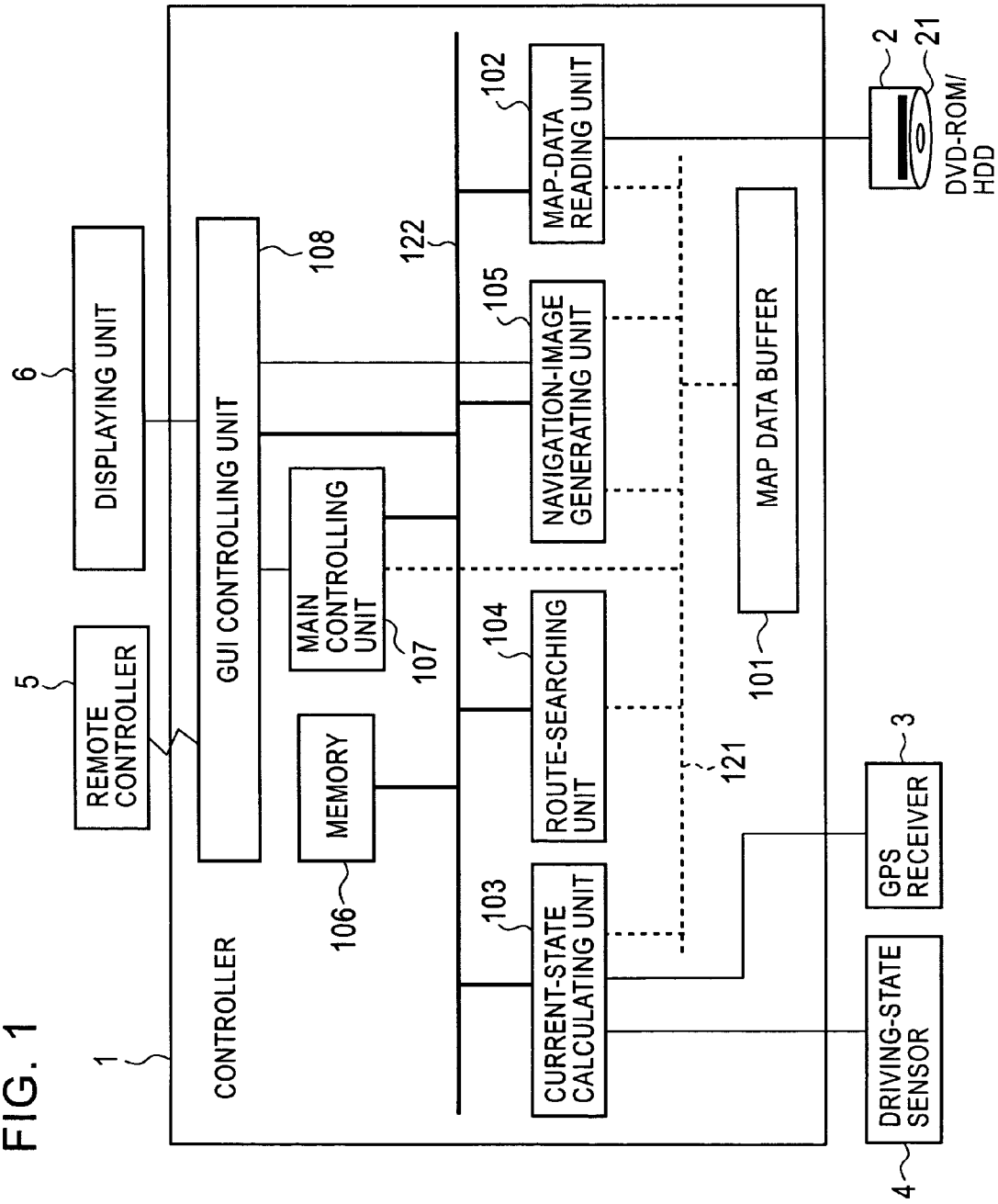
FIG. 1 is a block diagram illustrating the structure of a navigation apparatus according to an embodiment of the present invention.

FIG. 1 is a block diagram illustrating the structure of a navigation apparatus according to an embodiment. This navigation apparatus includes a controller 1, a recording-medium driving unit 2 for accessing a recording medium 21 that stores map data, for example, a DVD-ROM or a hard disk, a GPS receiver 3, a driving-state sensor 4 including, for example, an angular acceleration sensor and a vehicle speed sensor for detecting the driving state of a vehicle, a remote controller 5 for receiving user input, and a displaying unit 6.

The controller 1 includes a map data buffer 101, a map-data reading unit 102, a current-state calculating unit 103, a route-searching unit 104, a navigation-image generating unit 105, a memory 106, a main controlling unit 107, and a GUI controlling unit 108. Dotted lines 121 in the controller 1 show access paths from respective components to map data stored in the map data buffer 101. Thick lines 122 show paths between the components for transmitting control data and various other types of data. Thin lines connected to the GUI controlling unit 108 show paths between a user and the corresponding components for transmitting user commands and image data that input and output through the remote controller 5 and the displaying unit 6, respectively.

The controller 1 may be a regular CPU circuit including a microprocessor, a memory, and peripheral devices, for example, a graphics processor and a geometric processor. In this arrangement, the individual components in the controller 1 described above may be respective processes implemented by predetermined programs executed on the microprocessor. In this case, these programs may be distributed to the controller 1 through, for example, the recording medium 21 and appropriate communication paths.

Figure 2:
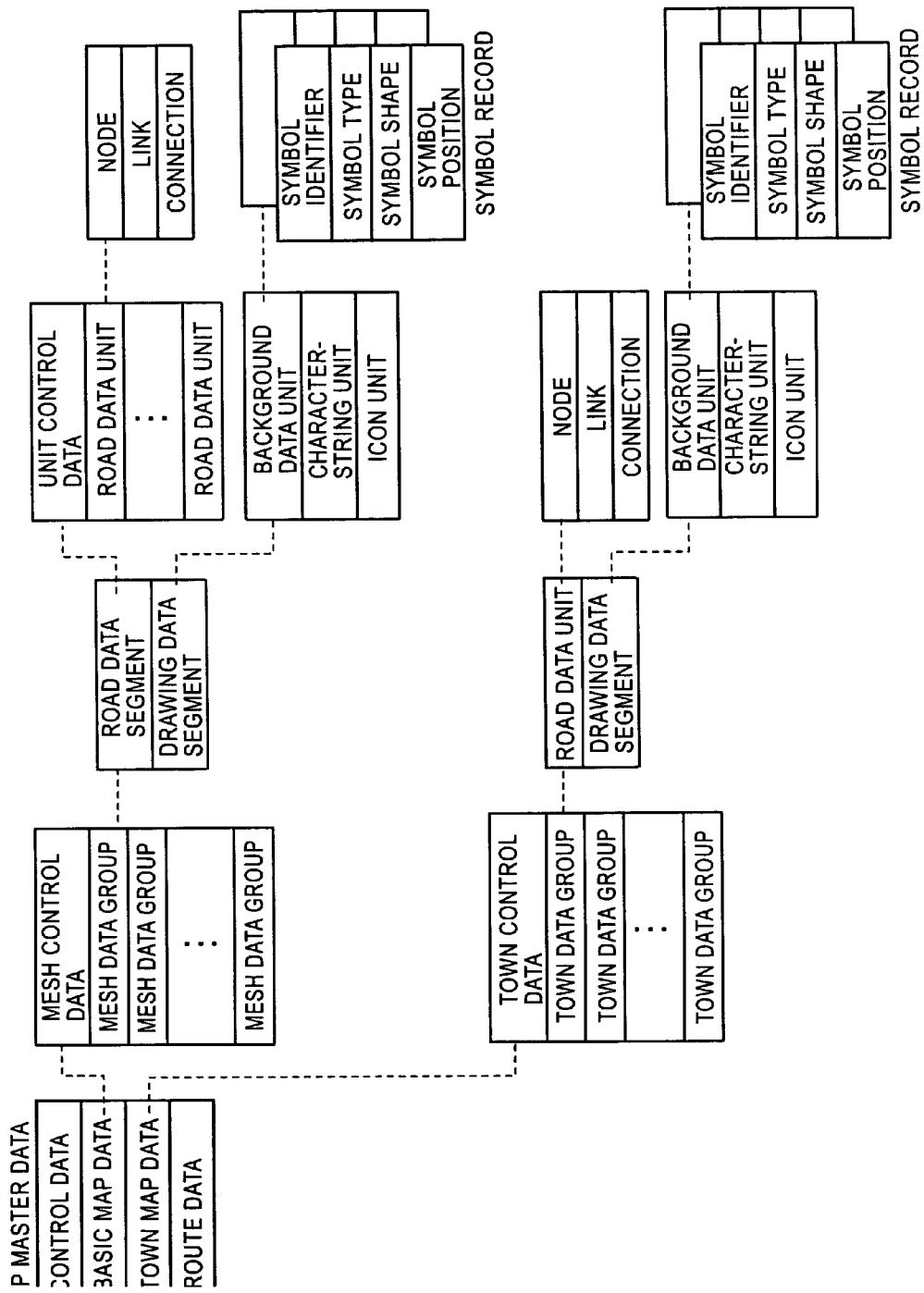
FIG. 2 illustrates a map master data included in the navigation apparatus according to an embodiment of the present invention.

The map master data is controlled for every mesh. Each mesh corresponds to a predetermined geographical area. As shown in FIG. 2, the map master data includes control data on, for example, regions of individual meshes and creation dates of map data, basic map data for drawing maps, town map data of town maps that are more detailed than the maps drawn from the basic map data, and route data.

The basic map data includes mesh data groups corresponding to the respective meshes described above. Each mesh data group includes a road data segment and a drawing data segment.

The road data segment includes a unit control data and a plurality of road data units. Roads in each mesh are represented at a plurality of detail levels. The road data units are set up for the respective detail levels. Each road data unit corresponds to a road in each mesh or each sub-mesh. The unit control data includes control information that describes, for example, the detail levels and geographical areas corresponding to the respective road data units.

In each road data unit, a road is represented as a set of links. Each link is a straight line. Both ends of the link are nodes. The road data unit includes [node] (hereinafter, brackets represent a field of a symbol record), [link], and [connection]. [Node] includes, for example, coordinates and attributes of each node. One of the attributes of the node is, for example, "intersection". [Link] includes, for example, identifiers of nodes at both ends of a link, the length and the direction of the link, link cost that shows the cost used in searching routes and that is assigned to the link, and the route number of a route including the link. [Connection] describes the connection and relationship between nodes and links in this road data unit and the other road data units.

The drawing data segment in the basic map data includes a background data unit, a character-string unit, and an icon unit. The background data unit includes symbol records including information on individual symbols serving as display elements on a map, for example, rivers, seas, parks, and railroads. The character-string unit includes texts showing names of, for example, buildings, roads, and intersections on a map. The icon unit includes information on icons that are marks showing buildings, for example, gas stations, on a map.

Each symbol record includes, for example, [symbol identifier] that shows an identifier of the symbol; [symbol type] that shows a type of the symbol, for example, "river" or "sea"; [symbol shape] that shows a shape of the symbol; and [symbol position] that shows a display position of the symbol on a map. Some of the symbol records in the basic map data represent light spots in a night view. The [symbol type] of these symbol records is "light spot".

The town map data includes town data groups corresponding to individual town areas and a town control data that describes, for example, relationships between the town data groups and geographical areas.

Each town data group includes a road data unit and a drawing data segment. Like the road data unit in the basic map data, the road data unit in the town data group includes [node], [link], and [connection].

Like the drawing data segment in the basic map data, the drawing data segment in the town data group includes a background data unit, a character-string unit, and an icon unit.

Like the background data unit in the basic map data, the background data unit in the town map data includes symbol records including information on individual symbols serving as display elements on a town map, for example, rivers, seas, parks, railroads, buildings, and roads. The character-string unit includes texts showing names of, for example, buildings, roads, and intersections on a town map. The icon unit includes information on icons that are marks showing buildings, for example, gas stations, on a town map.

Each symbol record includes, for example, [symbol identifier] that shows an identifier of a symbol; [symbol type] that shows a type of the symbol, for example, "geographical feature", "river", "sea", "road", or "building"; [symbol shape] that shows a shape of the symbol; and [symbol position] that shows a display position of the symbol on a map. Some of the symbol records in the town map data represent buildings on a town map. The [symbol type] of these symbol records is "building".

Figure 3:
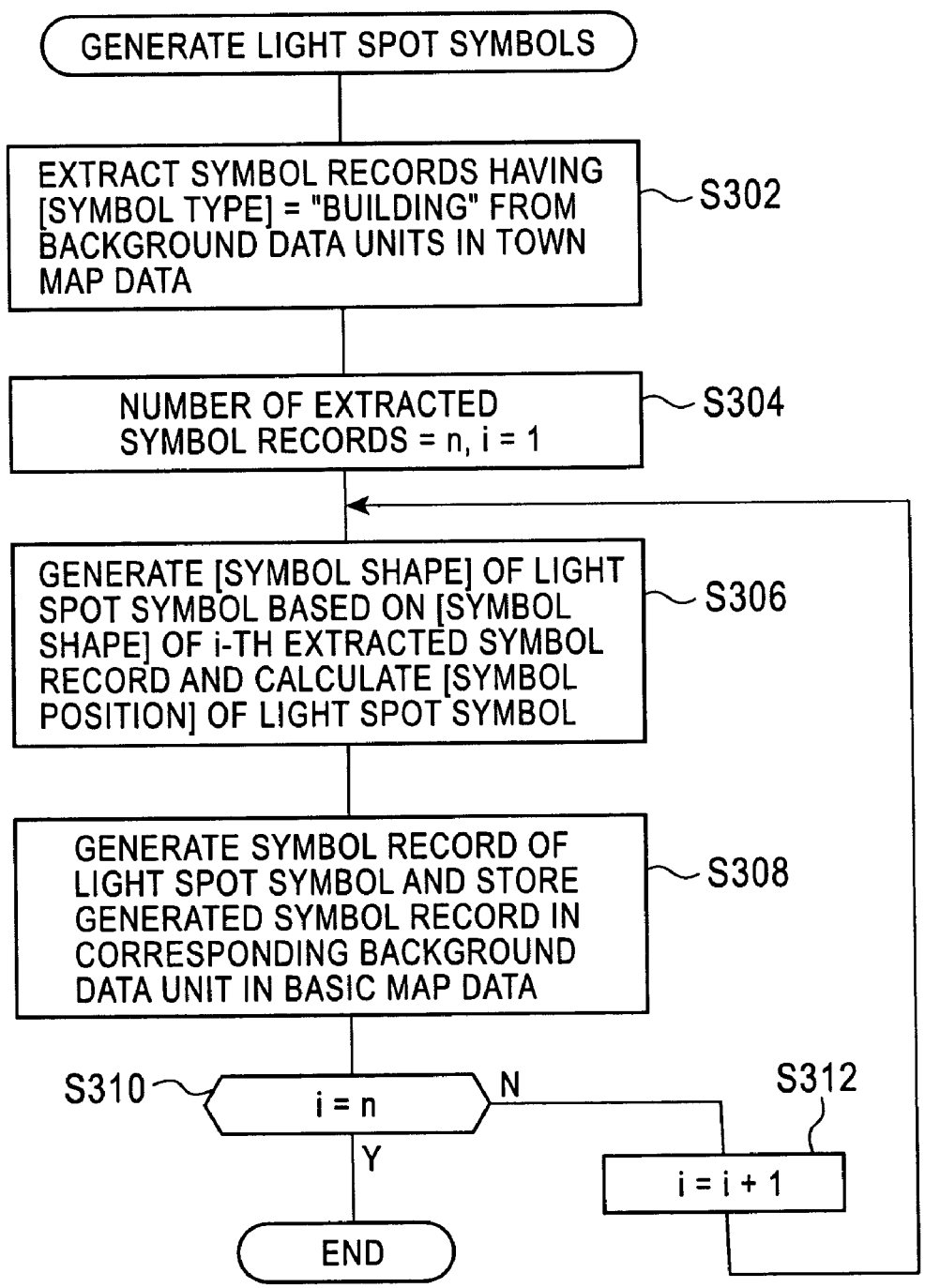
FIG. 3 is a flowchart illustrating the process of generating light spot symbols according to an embodiment of the present invention.

The symbol records of the light spot symbols in the basic map data are generated from the symbol records in the town data groups. With reference to FIG. 3, the process of generating the symbol records of the light spot symbols in the basic map data will now be described. This process is performed in a computer that stores the map master data that does not include the symbol records of the light spot symbols.

In act S302, symbol records having [symbol type]="building" are extracted from background data units in the town map data. The following processes are performed for every extracted symbol record.

In act S306, [symbol shape] of each light spot symbol is generated from corresponding [symbol shape] in the extracted symbol record, and [symbol position] of the light spot symbol is calculated with reference to corresponding [symbol position] in the extracted symbol record.

In act S308, the symbol record of each light spot symbol is generated. The generated symbol record has [symbol type] ="light spot" and includes the calculated [symbol shape] and [symbol position] of the light spot symbol. This symbol record is stored in the corresponding background data unit in the mesh data group in the basic map data. This mesh data group corresponds to a mesh including the [symbol position] of the generated symbol record.

The light spot symbols are generated from the symbol records of the building symbols in the following way.

Figure 4:
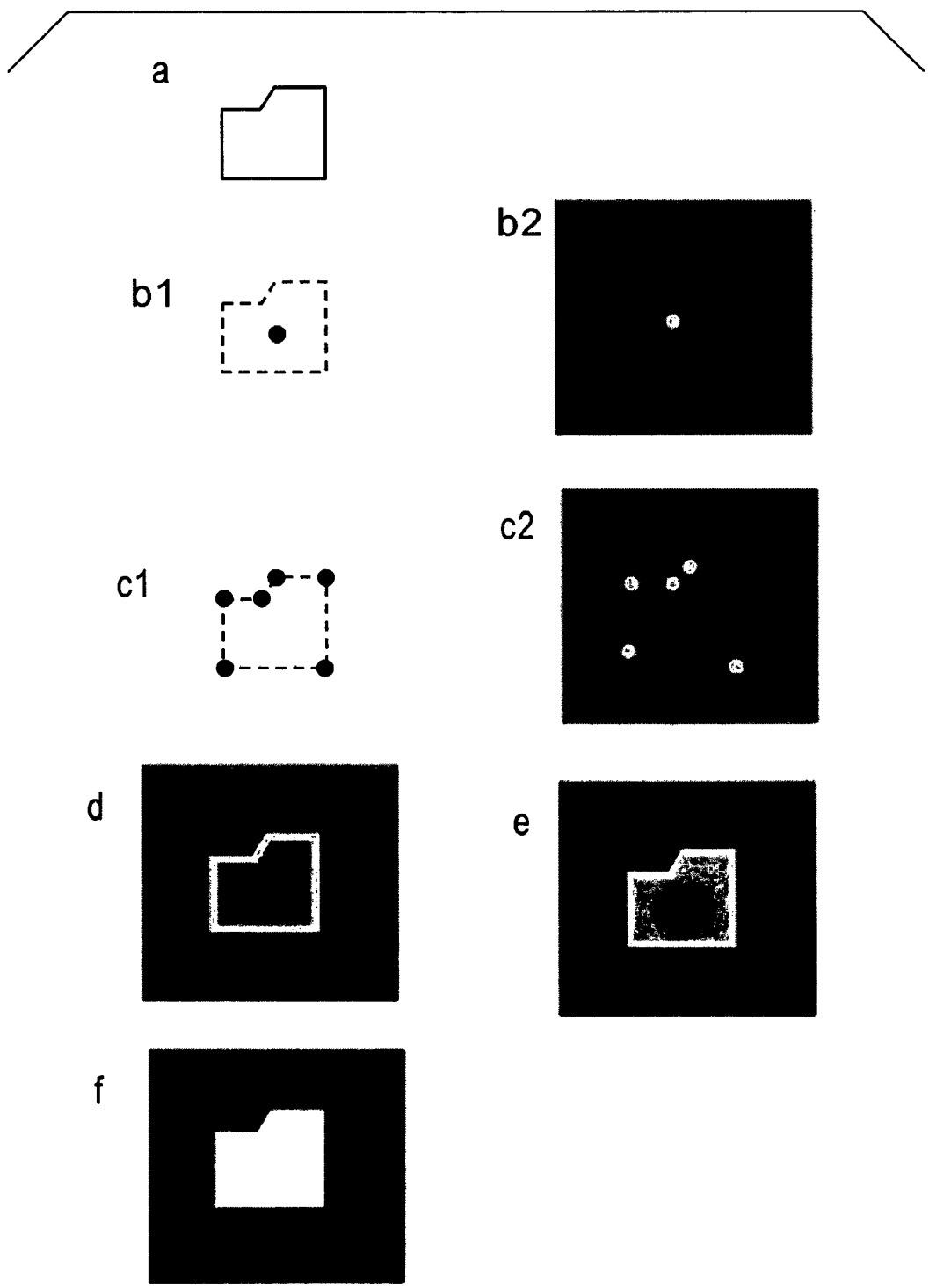
FIG. 4 illustrates types of the light spot symbols generated in an embodiment of the present invention.

For example, when a shape drawn from [symbol shape] of a building symbol is shown in Part a of FIG. 4, a dot as shown in Part b1 of FIG. 4 is generated as a light spot symbol. This dot is located on a point within the building symbol, for example, the center of mass of the building symbol. In this case, when the light spot symbol is highlighted in a dark background, the light spot symbol indicates the light of a building, as shown in Part b2 of FIG. 4. Alternatively, dots as shown in Part c1 of FIG. 4 may be generated as light spot symbols. These dots are located on some or all of vertexes of the building symbol. In this case, when the light spot symbols are highlighted in a dark background, the light spot symbols indicate the light of a building, as shown in Part c2 of FIG. 4.

[Symbol position] of each light spot symbol generated in the way described above corresponds to [symbol position] of the referred building symbol. When the light spot symbol is generated as shown in Part b1 of FIG. 4, a point in the building symbol, calculated from the [symbol position] of the building symbol, is defined as the [symbol position] of the light spot symbol.

Figure 5:
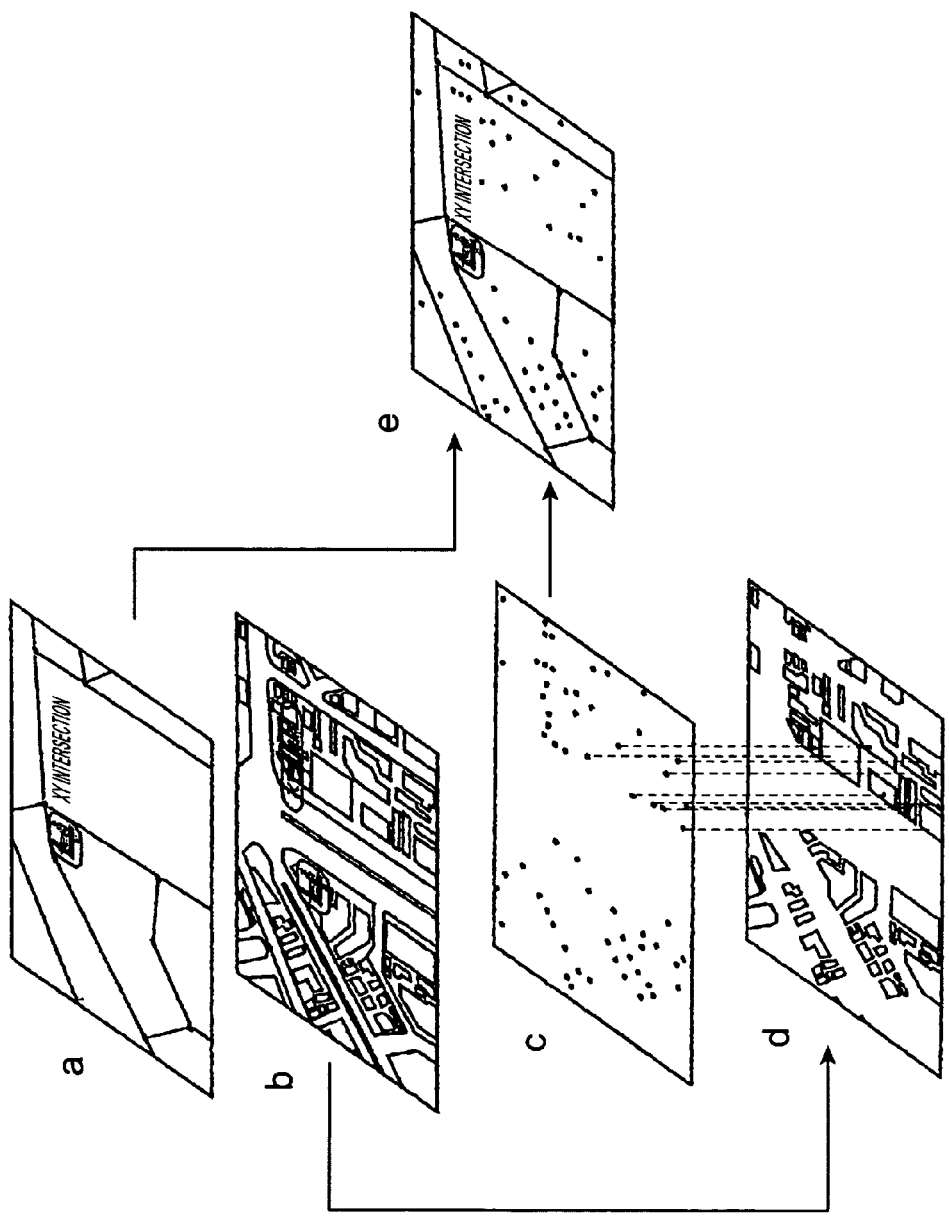
FIG. 5 illustrates a typical process of generating the light spot symbols according to an embodiment of the present invention.

According to this light-spot-symbol generating process, when a map drawn from the basic map data before the light-spot-symbol generating process is shown in Part a of FIG. 5 and a town map drawn from the town data group is shown in Part b of FIG. 5, light spot symbols shown in Part c of FIG. 5 are generated from respective building symbols in the town map shown in Part d of FIG. 5. Then, the symbol records of the generated light spot symbols are stored in the basic map data. As a result, the map drawn from the basic map data includes the light spot symbols, as shown in Part e of FIG. 5.

In this arrangement, the current-state calculating unit 103 in the controller 1 repetitively performs the following processes.

The current-state calculating unit 103 performs map matching between the current position estimated based on outputs from the GPS receiver 3 and the driving-state sensor 4 and a map that is read from the map data buffer 101. This map is drawn from the basic map data or the town map data of a region including the previous position. Then, the current-state calculating unit 103 stores coordinates of the most probable current position, the most probable traveling direction, and the most probable link at which the vehicle is present as the current position, the current traveling direction, and the traveling link, respectively, in the memory 106.

The main controlling unit 107 receives a user request for a destination through the remote controller 5 and the GUI controlling unit 108 and stores the destination in the memory 106.

Then, the main controlling unit 107 searches for a recommended route to the destination through the route-searching unit 104. The route-searching unit 104 reads road data in road data units within a required region in the basic map data from the map data buffer 101; calculates the lowest cost route through the current link from the current position to the destination in the memory 106 as the recommended route, based on a predetermined cost model using link costs in [link]; and stores route data of this recommended route in the memory 106.

When the current position in the memory 106 is close to the destination, the main controlling unit 107 determines that the vehicle has reached the destination and clears the destination and the recommended route in the memory 106.

The main controlling unit 107 determines the region of a map to be displayed in response to the current position in the memory 106 and the current map scale set by, for example, a user; defines the determined region as a map display area; and sends the navigation-image generating unit 105 a command for generating a navigation image corresponding to the map display area. The main controlling unit 107 repeats this process. The main controlling unit 107 also changes the map display area in response to, for example, the scrolling operation by the user.

Upon receiving a command for generating the navigation image, the navigation-image generating unit 105 generates a navigation image showing, for example, the current position, the recommended route, and the destination, and the navigation image is superimposed on a map image generated by a map-drawing process. Then, the navigation-image generating unit 105 outputs this superimposed image to the displaying unit 6 through the GUI controlling unit 108. The navigation-image generating unit 105 repeats this process.

Figure 6:
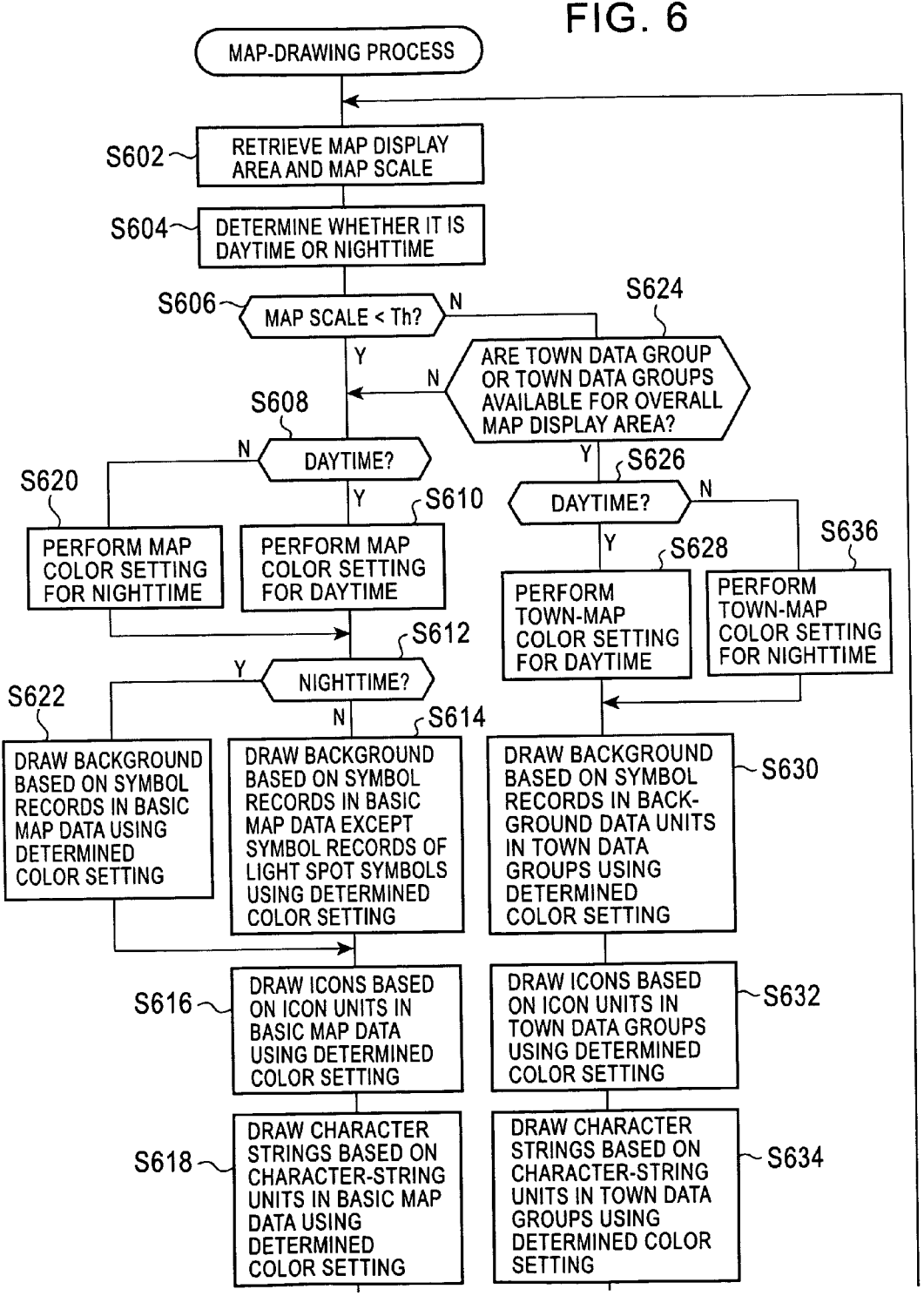
FIG. 6 is a flowchart illustrating the map-drawing process according to an embodiment of the present invention.

The map-drawing process by the navigation-image generating unit 105 will now be described with reference to FIG. 6. In act S602, the navigation-image generating unit 105 retrieves the current map scale and a map display area designated by the main controlling unit 107. In act S604, the navigation-image generating unit 105 determines whether it is daytime or nighttime, based on, for example, the time indicated by a clock in the navigation apparatus or the status of a lighting unit of the vehicle, i.e., headlamps or side lamps.

The navigation-image generating unit 105 determines whether the current map scale is less than a predetermined threshold Th. When the current map scale is less than the threshold Th, the process proceeds to act S608. When the current map scale is not less than the threshold Th, the process proceeds to act S624. In act S624, the navigation-image generating unit 105 determines whether a town data group or town data groups are available for the overall map display area. When no town data group is available for part of the map display area, the process proceeds to act S608. When any town data group is available for the overall map display area, the process proceeds to act S626.

In act S626, when it is nighttime, the process proceeds to act S636 where the navigation-image generating unit 105 performs predetermined town-map color setting to draw a nighttime town map. When it is daytime, the process proceeds to act S628 where the navigation-image generating unit 105 performs predetermined town-map color setting for daytime to draw a daytime town map. After either act S628 or act S636, the process proceeds to act S630 where the navigation-image generating unit 105 extracts symbol records having [symbol position] within the map display area from drawing data segments in the town map data and draws symbols based on the respective extracted symbol records using the determined color setting at the map scale. The color setting used for drawing the map defines, for example, combinations of drawing colors for individual values of [symbol type], and drawing colors of character strings and icons.

In act S632, the navigation-image generating unit 105 extracts icon units having display positions within the map display area from drawing data segments in the town map data and draws icons based on the extracted icon units using the determined color setting. In act S634, the navigation-image generating unit 105 extracts character-string units having display positions within the map display area from drawing data segments in the town map data and draws character strings based on the extracted character-string units using the determined color setting to complete the map image. Then, the process goes back to act S602.

On the other hand, in act S608, when it is nighttime, the process proceeds to act S620 where the navigation-image generating unit 105 performs predetermined map color setting to draw a nighttime map. When it is daytime, the process proceeds to act S610 where the navigation-image generating unit 105 performs predetermined map color setting for daytime to draw a daytime map. After either act S610 or act S620, the process proceeds to act S612. In act S612, when it is nighttime, the process proceeds to act S622. In act S622, the navigation-image generating unit 105 extracts symbol records having [symbol position] within the map display area from drawing data segments in the basic map data and draws symbols based on the respective extracted symbol records using the determined color setting at the map scale. Then, the process proceeds to act S616.

In act S612, when it is daytime, the process proceeds to act S614. In act S614, the navigation-image generating unit 105 extracts symbol records having [symbol position] within the map display area and having [symbol type]≠"light spot" from drawing data segments in the basic map data and draws symbols based on the respective extracted symbol records using the determined color setting at the map scale. Then, the process proceeds to act S616.

In act S616, the navigation-image generating unit 105 extracts icon units having display positions within the map display area from drawing data segments in the basic map data and draws icons based on the extracted icon units using the determined color setting. In act S618, the navigation-image generating unit 105 extracts character-string units having display positions within the map display area from drawing data segments in the basic map data and draws character strings based on the extracted character-string units using the determined color setting to complete the map image. Then, the process goes back to act S602.

FIGS. 7A, 7B, 7C, and 7D illustrate typical navigation images according to the first embodiment.

Figure 7A:
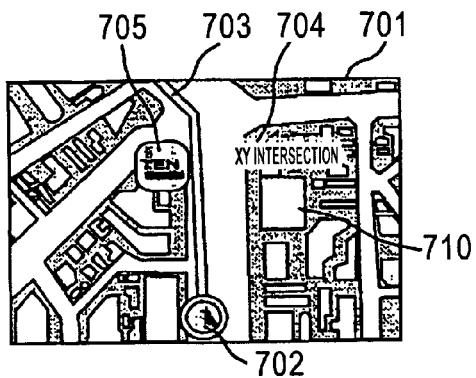
FIGS. 7A, 7B, 7C, 7D, and 7E illustrate typical navigation images according to an embodiment of the present invention.
Figure 7B:
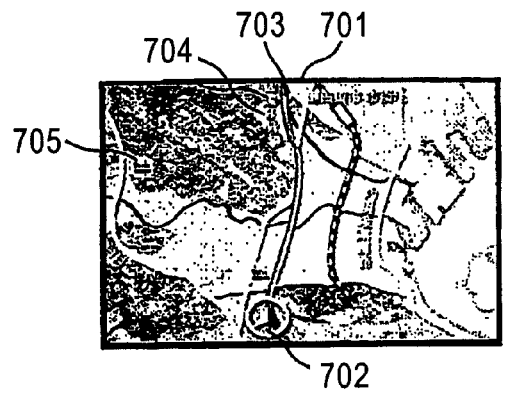
Figure 7C:
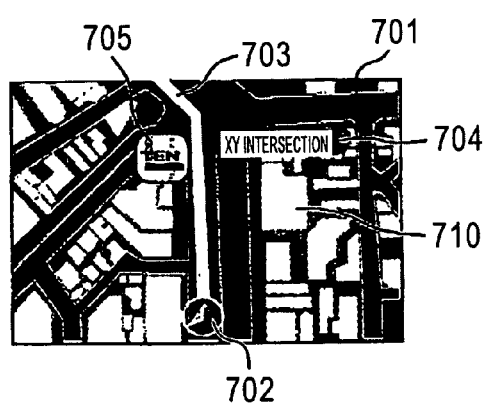
Figure 7D:
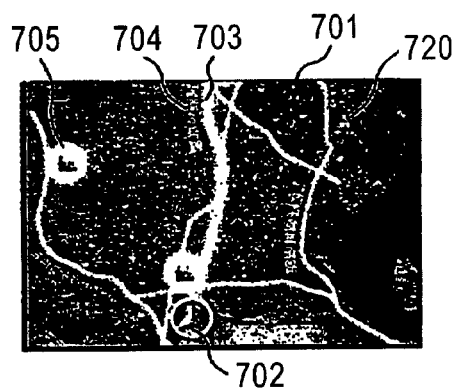

The navigation image shown in FIG. 7A is drawn based on the town map data using the town-map color setting for daytime in acts S630, S632, and S634 in the map-drawing process under a condition that, in daytime, the map scale is not less than the threshold Th, and a town data group or town data groups are available for the map display area. FIG. 7B illustrates the navigation image when a map image is drawn based on the basic map data using the map color setting for daytime in acts S614, S616, and S618 in the map-drawing process under a condition that, in daytime, the map scale is less than the threshold Th. FIG. 7C illustrates the navigation image when a map image is drawn based on the town map data using the town-map color setting for nighttime in acts S630, S632, and S634 in the map-drawing process under a condition that, in nighttime, the map scale is not less than the threshold Th, and a town data group or town data groups are available for the map display area. FIG. 7D illustrates the navigation image when a map image is drawn based on the basic map data using the map color setting for nighttime in acts S622, S616, and S618 in the map-drawing process under a condition that, in nighttime, the map scale is less than the threshold Th.

As shown in the drawings, each navigation image includes, a current position mark 702 and a recommended route symbol 703 on a map image 701. The current position mark 702 represents the current position in the memory 106, and the recommended route symbol 703 represents the recommended route in the memory 106. When the map display area includes the destination, a destination mark is also drawn on the map image 701.

The map image 701 also includes character strings 704 drawn from character-string units and icons 705 drawn from icon units on a background drawn from background data units.

In the town-map color setting for daytime, bright colors are mainly used for individual symbols to represent daytime and to ensure high visibility in ambient light, as shown in FIG. 7A. In the town-map color setting for nighttime, dark colors (colors having low brightness) are mainly used for individual symbols to represent nighttime and to reduce glare in darkness, as shown in FIG. 7C. As an exceptional case in the town-map color setting for nighttime, bright colors, for example, white and yellow, are used for building symbols 710 having [symbol type]="building" to represent city light, as shown in Parts d, e, and f of FIG. 4. In FIG. 7C, each building symbol 710 is represented by a plane figure, and the overall plane figure is drawn in a bright color, as shown in Part f of FIG. 4. When the building symbol 710 is represented by lines, the lines may be drawn in a bright color, as shown in Part d of FIG. 4.

In the map color setting for daytime, bright colors are mainly used for individual symbols to represent daytime and to ensure high visibility in ambient light, as shown in FIG. 7B. In the map color setting for nighttime, dark colors (colors having low brightness) are mainly used for individual symbols to represent nighttime and to reduce glare in darkness, as shown in FIG. 7D. As an exceptional case in the map color setting for nighttime, bright colors, for example, white and yellow, are used for light spot symbols 720 to represent city light.

Figure 7E:
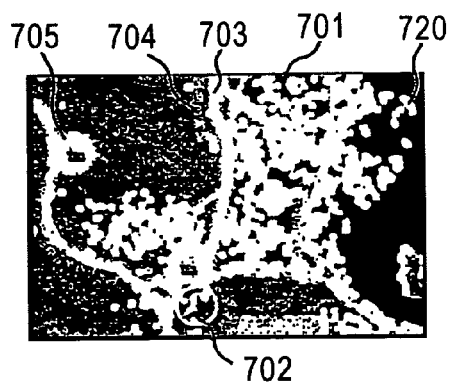

According to the first embodiment, bright building symbols are drawn on a map to represent a night view at a large scale. Only bright representative points, for example, the center of mass or vertexes of each building symbol, are drawn on a map to represent a night view at a small scale. Thus, a night view having high visibility and high clearness can be presented regardless of the map scale, as shown in FIG. 7B. That is, if bright building symbols are drawn on a map even at a small scale as in a case in which a large scale is used, the map is filled with light spots, thereby impairing visibility and clearness, as shown in FIG. 7E. In contrast, according to this embodiment, a proper number of light spots can be provided at a proper density to represent a night view, as shown in FIG. 7D.

Moreover, according to this embodiment, only data of representative points of building symbols is stored in the map master data to display light spot symbols at a small map scale. Thus, displaying a night view at a small map scale requires a relatively small capacity for storing map data. Moreover, since data of representative points of building symbols are stored in the basic map data, a map image having a small map scale can be generated with reference to only the basic map data but not the town map data storing symbol records of the building symbols.

Figure 9A:
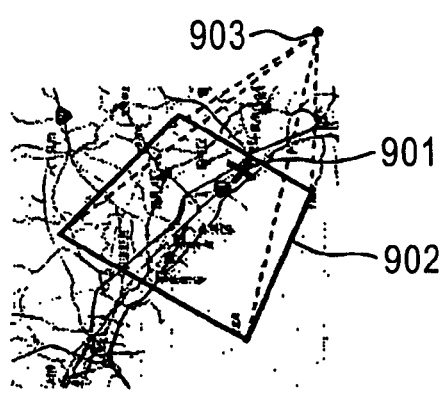
FIGS. 9A, 9B, and 9C illustrate a typical process of generating a map image using a bird's-eye view according to an embodiment of the present invention.
Figure 9B:
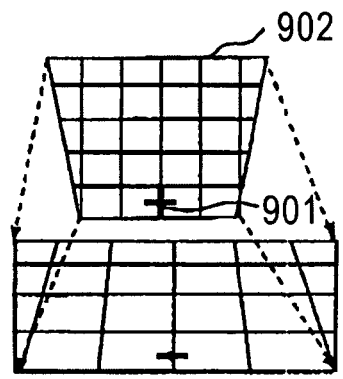
Figure 9C:
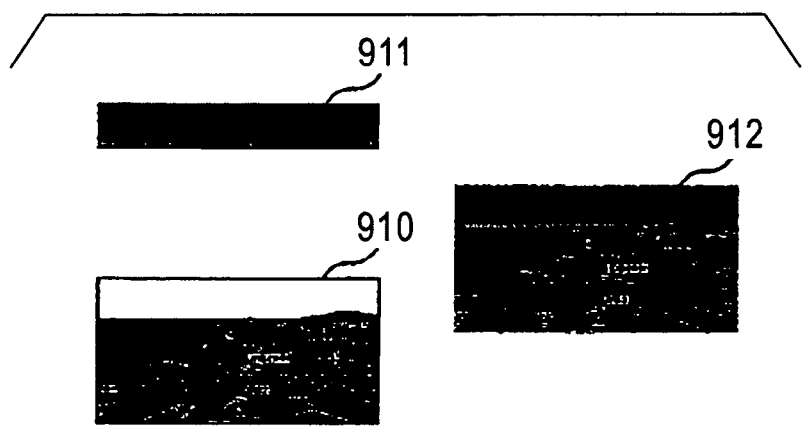

In this embodiment, a map is displayed in a two-dimensional mode. Alternatively, the map may be displayed by another method as follows: A display map area 902 covers a geographical area having a trapezoid-shape, as shown in FIG. 9A. The upper edge of the trapezoid corresponds to a reference position 901, for example, the current position. The bottom edge of the trapezoid corresponds to the far side from the reference position 901 in the traveling direction. The far side is displayed in the upper area of a map image. Coordinates in the map of the display map area 902 are transformed, as shown in FIG. 9B, to generate a bird's-eye view image 910, as shown in FIG. 9C. The bird's-eye view image 910 is obtained by viewing the display map area 902 from a viewpoint 903 shown in FIG. 9A that is in midair above an area behind the vehicle. Then, the generated bird's-eye view image 910 is combined with a background image 911 that represents the sky above the horizon including the water horizon to generate a map image 912.

The current position mark and the recommended route symbol are drawn in the bird's-eye view image 910 and the map image 912 in FIG. 9C to facilitate the understanding of the relationship between the navigation images and the drawings. Actually, the navigation-image generating unit 105 separately draws the current position mark and the recommended route symbol in the drawings on the map image generated in the map-drawing process.

The navigation apparatus according to the first embodiment may generate a navigation image including the bird's-eye view described above. In this case, it is preferable that the brightness of the drawing color and the size of each of the light spot symbols and the building symbols decrease as the distance from a reference position to each of the light spot symbols and the building symbols increases (as the display position of each of the light spot symbols and the building symbols shifts to the top) in the map-drawing process of a nighttime map. According to this process, a realistic display of a nighttime map can be achieved through the bird's-eye view.

A second embodiment may be implemented in which symbol records of light spot symbols are not provided in the basic map data, but the light spot symbols are dynamically generated to be drawn on a map upon displaying the map. That is, the first embodiment is modified so that symbol records having [symbol type]="light spot" are not provided in the basic map data, and the navigation-image generating unit 105 performs the map-drawing process in the way described below.

Figure 8:
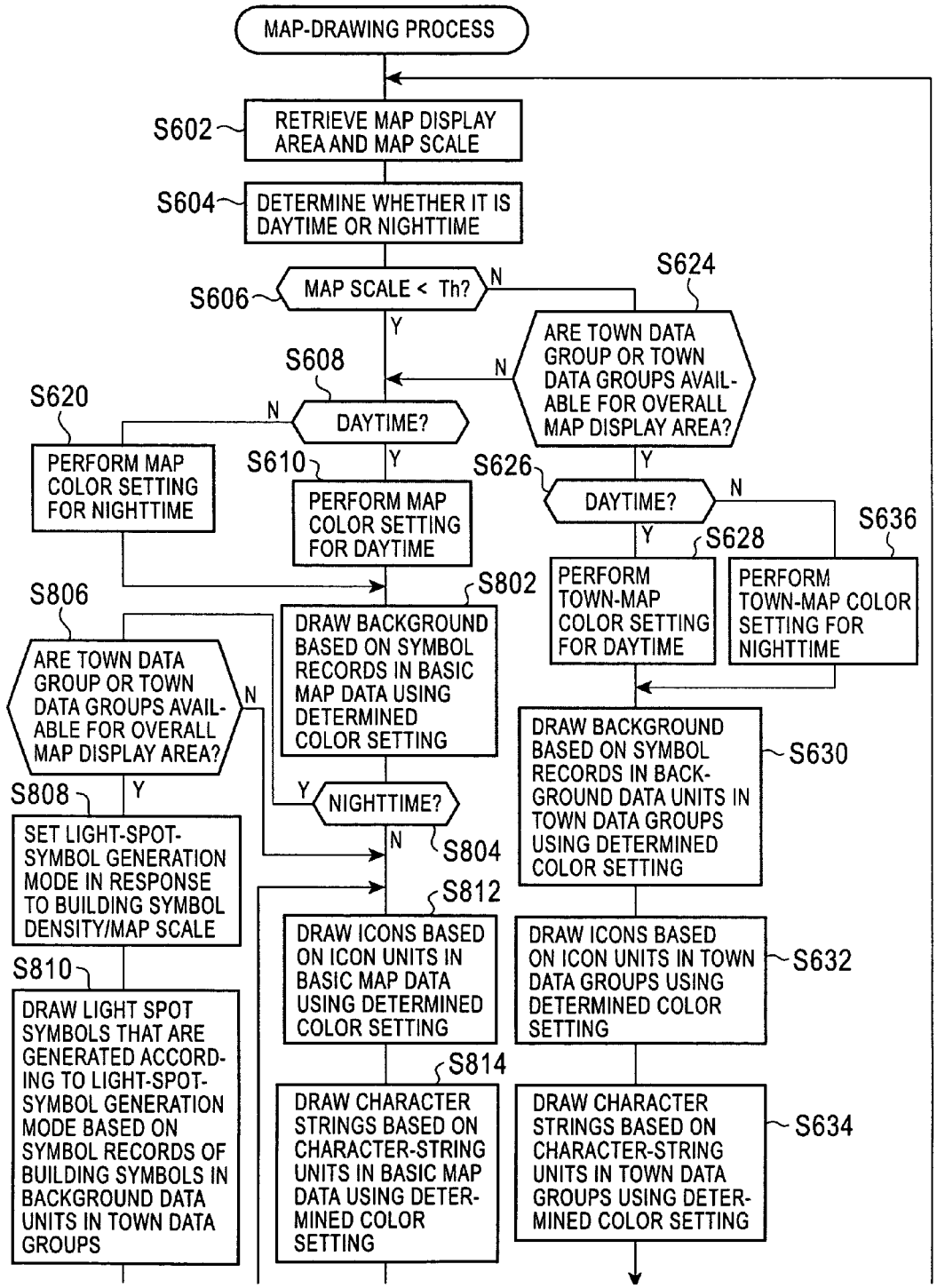
FIG. 8 is a flowchart illustrating the map-drawing process according to another embodiment of the present invention.

FIG. 8 is a flowchart illustrating the map-drawing process according to the second embodiment. As in the first embodiment, the navigation-image generating unit 105 retrieves the map scale and a map display area; selects daytime or nighttime; and determines whether the map scale is less than a predetermined threshold Th (acts S602, S604, and S606). When the map scale is not less than the predetermined threshold Th, the process proceeds to act S624 where the navigation-image generating unit 105 determines whether a town data group or town data groups are available for the overall map display area.

When the map scale is not less than the predetermined threshold Th and any town data group is available for the overall map display area, the navigation-image generating unit 105 generates a map image from the town map data for either daytime or nighttime (acts S626 to S636) and goes back to act S602, as in the first embodiment.

On the other hand, when the map scale is less than the predetermined threshold Th or no town data group is available for part of the map display area, the process proceeds to act S608. In act S608, when it is nighttime, the process proceeds to act S620 where the navigation-image generating unit 105 performs predetermined map color setting to draw a nighttime map. When it is daytime, the process proceeds to act S610 where the navigation-image generating unit 105 performs predetermined map color setting for daytime to draw a daytime map.

After either act S610 or act S620, the process proceeds to act S802 where the navigation-image generating unit 105 extracts symbol records having [symbol position] within the map display area from drawing data segments in the basic map data and draws symbols based on the respective extracted symbol records using the determined color setting at the map scale. Then, the process proceeds to act S804. In act S804, when it is daytime, the process proceeds to act S812. In act S812, the navigation-image generating unit 105 extracts icon units having display positions within the map display area from drawing data segments in the basic map data and draws icons based on the extracted icon units using the determined color setting. Then, in act S814, the navigation-image generating unit 105 extracts character-string units having display positions within the map display area from drawing data segments in the basic map data and draws character strings based on the extracted character-string units using the determined color setting to complete the map image. Then, the process goes back to act S602.

On the other hand, in act S804, when it is nighttime, the process proceeds to act S806 where the navigation-image generating unit 105 determines whether a town data group or town data groups are available for the overall map display area. When no town data group is available for part of the map display area, the process proceeds to act S812. Then, in acts S812 and S814, icons and character strings are drawn as described above to complete the map image. The process then goes back to act S602.

In act S806, when any town data group is available for the overall map display area, the process proceeds to act S808. In act S808, with reference to town data groups, the navigation-image generating unit 105 calculates the density of building symbols in the map display area from the number of symbol records that have [symbol position] within the map display area or a mesh including the map display area and that have [symbol type]="building", divides the calculated density by the map scale to obtain an evaluated value, and then determines a light-spot-symbol generation mode in response to the evaluated value. The light-spot-symbol generation mode will be described below. Then, in act S810, the navigation-image generating unit 105 draws light spot symbols on a map. With reference to town data groups, the light spot symbols are generated from [symbol shape] of the corresponding symbol records having [symbol position] within the map display area and having [symbol type]="building" in the determined light-spot-symbol generation mode. After act S810, in acts S812 and S814, icons and character strings are drawn as described above to complete the map image. The process then goes back to act S602.

The light-spot-symbol generation mode referred to above will now be described.

In the second embodiment, there are five light-spot-symbol generation modes. In a first mode, a light spot symbol is generated as a bright dot on a point within a building symbol such as the center of mass of the building symbol, as shown in Part b2 of FIG. 4. In a second mode, light spot symbols are generated as bright dots on some or all of vertexes of a building symbol, as shown in Part c2 of FIG. 4. In a third mode, a light spot symbol is generated as a bright outline of a building symbol, as shown in Part d of FIG. 4. In a fourth mode, a light spot symbol is generated as a building symbol. The outline of this building symbol and part of the area within the building symbol are drawn in a bright color, as shown in Part e of FIG. 4. In a fifth mode, a light spot symbol is generated as a building symbol. The overall building symbol is drawn in a bright color, as shown in Part f of FIG. 4.

The evaluated value is ranked into the first grade (highest) to the fifth grade (lowest). In act S808, when the evaluated value falls in the first grade, the navigation-image generating unit 105 selects the first light-spot-symbol generation mode. Similarly, the second light-spot-symbol generation mode for the second grade. The third light-spot-symbol generation mode for the third grade. The fourth light-spot-symbol generation mode for the fourth grade. The fifth light-spot-symbol generation mode for the fifth grade.

Consequently, the bright area of each light spot symbol decreases as the map scale decreases. Moreover, the bright area of each light spot symbol decreases as the density of building symbols increases.

Thus, according to the second embodiment, a night view having high visibility and high clearness can be presented regardless of the map scale and building density in a map display area, as in the first embodiment. That is, light spot symbols each having a small bright area are drawn on a map of a region having a large building density, and the map is not filled with the light spots, thereby ensuring high visibility. Moreover, light spot symbols each having a large bright area can be drawn on a map of a region having a small building density.

In the above description of the second embodiment, the same light-spot-symbol generation mode is applied to an overall map image to be displayed. Alternatively, the region corresponding to the map image may be divided into sections corresponding to, for example, districts (cities or towns). Then, the density of building symbols and the evaluated value may be calculated for each section, an applicable light-spot-symbol generation mode may be selected for the section in response to the evaluated value, and light spot symbols may be drawn on the section in the selected light-spot-symbol generation mode.

Moreover, the navigation apparatus according to the second embodiment may generate the map image 912 including the bird's-eye view image 910 shown in FIG. 9C. In this case, it is preferable that the brightness of the drawing color and the size of each of the light spot symbols and the building symbols decrease as the distance from a reference position to each of the light spot symbols and the building symbols increases (as the display position of each of the light spot symbols and the building symbols shifts to the top) in the map-drawing process of a nighttime map.

According to this process, a realistic display of a nighttime map can be achieved through the bird's-eye view.

In the map-drawing process according to the third embodiment, the navigation-image generating unit 105 generates the map image 912 including the bird's-eye view image 910 and the background image 911 representing the sky above the horizon including the water horizon, as shown in FIG. 9C.

Figure 10:
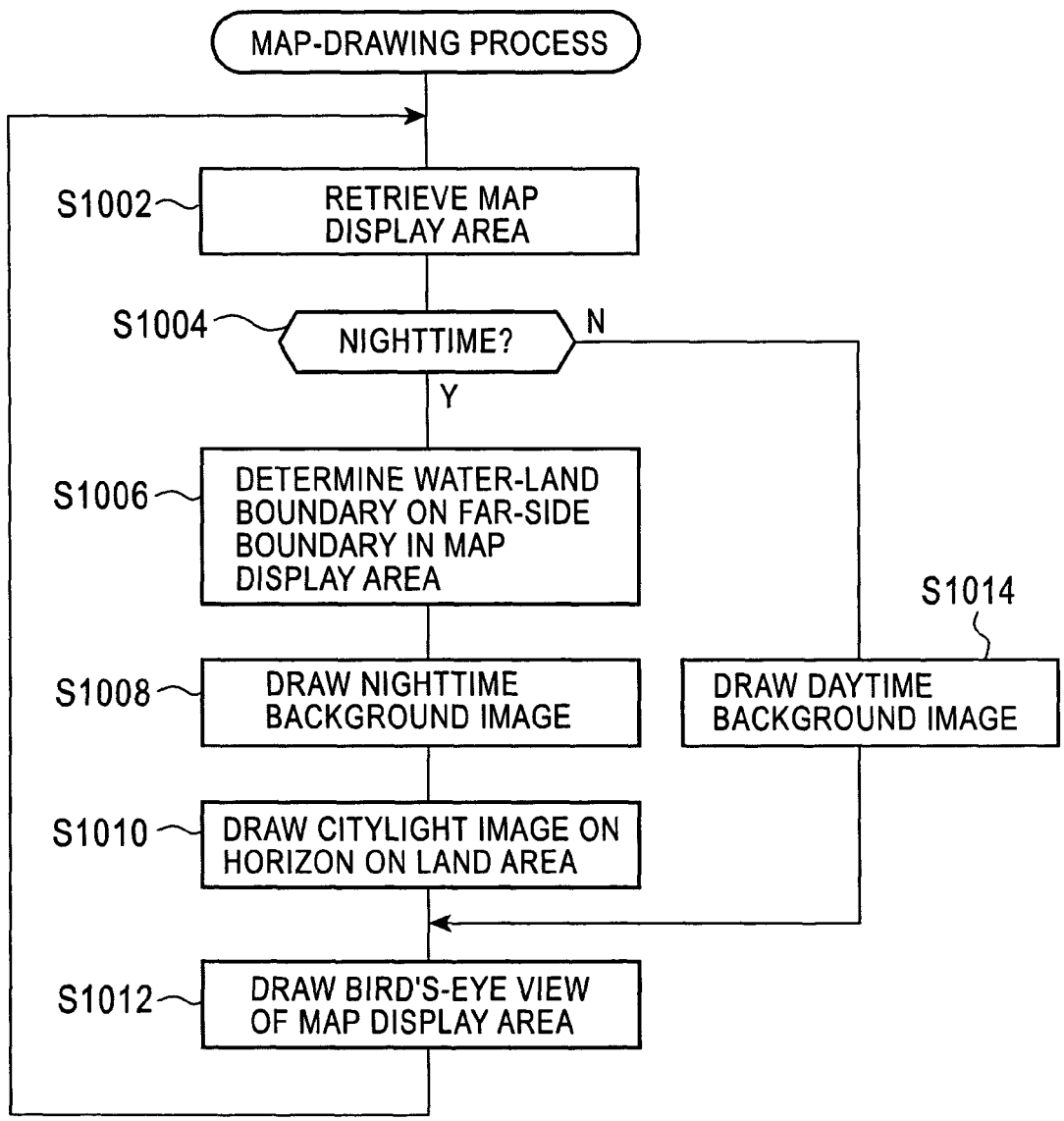
FIG. 10 is a flowchart illustrating the map-drawing process according to another embodiment of the present invention.
Figure 11A:
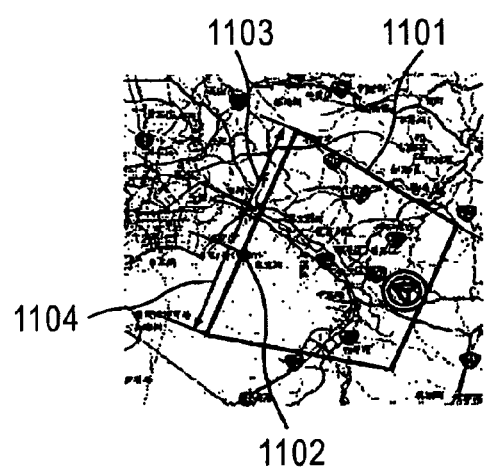
FIGS. 11A, 11B, 11C, and 11D illustrate a typical process of generating a map image according to another embodiment of the present invention.

FIG. 10 is a flowchart illustrating the map-drawing process according to the third embodiment. In act S1002, the navigation-image generating unit 105 retrieves a map display area for a bird's-eye view designated by the main controlling unit 107. This map display area covers an area 1101 having a trapezoid-shape, as shown in FIG. 11A. The upper edge of the trapezoid corresponds to that of a map image to be displayed. Then, in act S1004, the navigation-image generating unit 105 determines whether it is daytime or nighttime. When it is daytime, the process proceeds to act S1014 where the navigation-image generating unit 105 draws a predetermined daytime background, for example, an image representing the sky, on the upper portion of a map-image drawing area. Then, the process proceeds to act S1012. In act S1012, the navigation-image generating unit 105 draws a map image of the map display area through the map-drawing process, as in the first and the second embodiments; transforms coordinates of this map image to generate a bird's-eye view image, as shown in FIG. 9B; and disposes this bird's-eye view image on the lower portion of the map-image drawing area to complete the map image. Then, the process goes back to act S1002.

In act S1004, when it is nighttime, the process proceeds to act S1006. In act S1006, the navigation-image generating unit 105 determines an intersecting point 1102 of the far-side boundary (the upper edge of a map to be displayed) of the map display area and the water-land boundary, i.e., the boundary between a water area 1104, such as a sea and a lake, and a land area 1103, as shown in FIG. 11A. The map master data shown in FIG. 2 includes data on shorelines and water-land boundaries for this process.

Figure 11B:
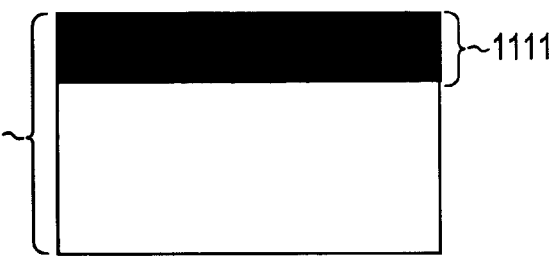
Figure 11C:
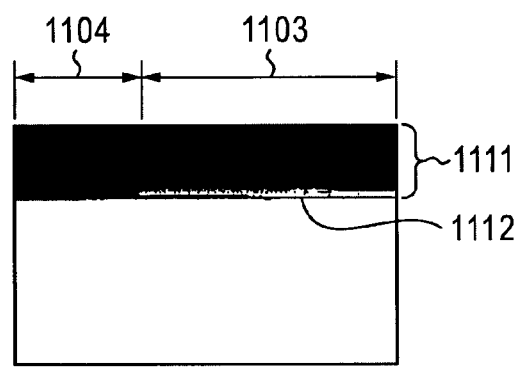

Then, in act S1008, the navigation-image generating unit 105 draws a predetermined nighttime background image 1111 on the upper portion of a map-image drawing area 1110, as shown in FIG. 11B. Then, the process proceeds to act S1010. In act S1010, as shown in FIG. 11C, the navigation-image generating unit 105 determines the land area 1103 and the water area 1104 on the far-side boundary of the map display area based on the intersecting point 1102 determined in act S1006, and draws a city light image 1112 representing city lights on the lower edge of the nighttime background image 1111 at a portion corresponding to the land area 1103. The lower edge represents the horizon including the water horizon.

Figure 11D:
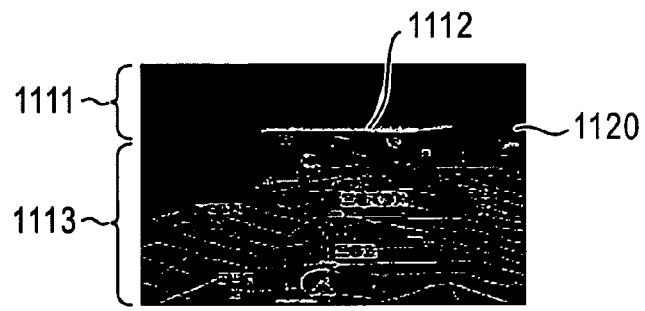

Then, in act S1012, the navigation-image generating unit 105 draws a map image of the map display area through the map-drawing process, as in the first and the second embodiments; transforms coordinates of this map image to generate a bird's-eye view image, as shown in FIG. 9B; and disposes the bird's-eye view image 1113 on the lower portion of the map-image drawing area to complete the map image, as shown in FIG. 11D. Then, the process goes back to act S1002. When the map master data includes data on the altitude of land, the navigation-image generating unit 105 may generate the bird's-eye view image 1113 including a symbol 1120 that represents geographical features appearing on the horizon, for example, mountains and hills.

The current position mark and the recommended route symbol are drawn in FIG. 11D to facilitate the understanding of the relationship between the navigation images and the drawings when the main controlling unit 107 determines the map display area with reference to the current position. Actually, the navigation-image generating unit 105 separately draws the current position mark and the recommended route symbol in the drawings on the map image generated in the map-drawing process.

In FIG. 9C, the map image 912 includes a fixed pattern on the overall bottom edge of the background image 911 for representing city lights of the far side. The bottom edge represents the horizon. Thus, the city lights are unnaturally displayed even on the water horizon where the city lights do not exist. In contrast, according to the third embodiment, such an unnatural display can be prevented.

In the map-drawing process according to the fourth embodiment, the navigation-image generating unit 105 generates the map image 912 including the bird's-eye view image 910 and the background image 911 representing the sky above the horizon including the water horizon, as shown in FIG. 9C.

Figure 12:
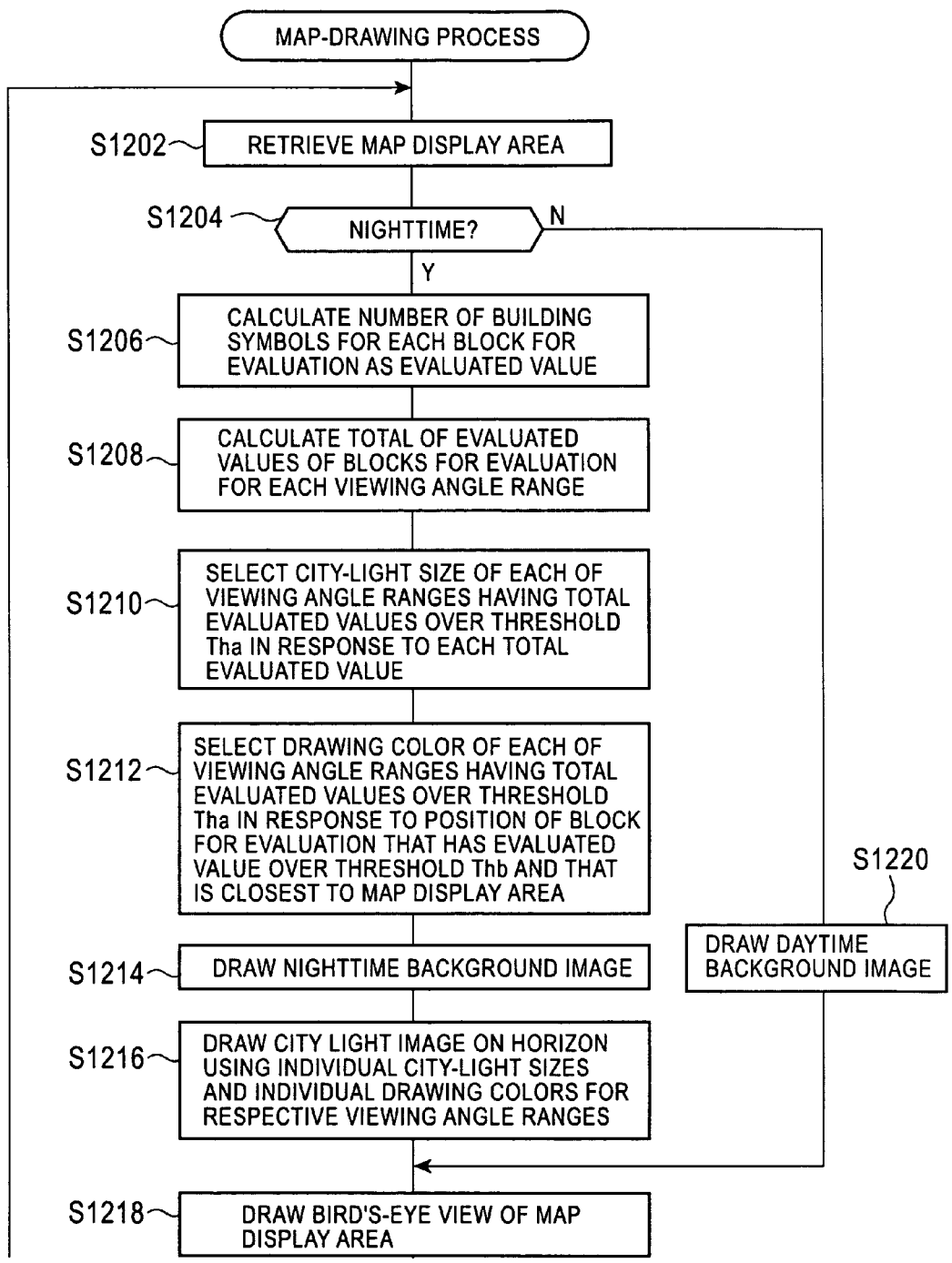
FIG. 12 is a flowchart illustrating the map-drawing process according to yet another embodiment of the present invention.

FIG. 12 is a flowchart illustrating the map-drawing process according to the fourth embodiment. In act S1202, the navigation-image generating unit 105 retrieves a map display area for a bird's-eye view designated by the main controlling unit 107. Then, in act S1204, the navigation-image generating unit 105 determines whether it is daytime or nighttime. When it is daytime, the process proceeds to act S1220 where the navigation-image generating unit 105 draws a predetermined daytime background, for example, an image representing the sky, on the upper portion of a map-image drawing area. Then, the process proceeds to act S1218. In act S1218, the navigation-image generating unit 105 draws a map image of the map display area through the map-drawing process, as in the first and the second embodiments; transforms coordinates of this map image to generate a bird's-eye view image, as shown in FIG. 9B; and disposes this bird's-eye view image on the lower portion of the map-image drawing area to complete the map image. Then, the process goes back to act S1202.

In act S1204, when it is nighttime, the process proceeds to act S1206. In act S1206, the navigation-image generating unit 105 calculates the number of building symbols having [symbol position] within individual blocks for evaluation, based on symbol records having [symbol type]="building" in background data units in the town map data. The calculated number is used as an evaluated value for each block for evaluation.

Figure 13A:
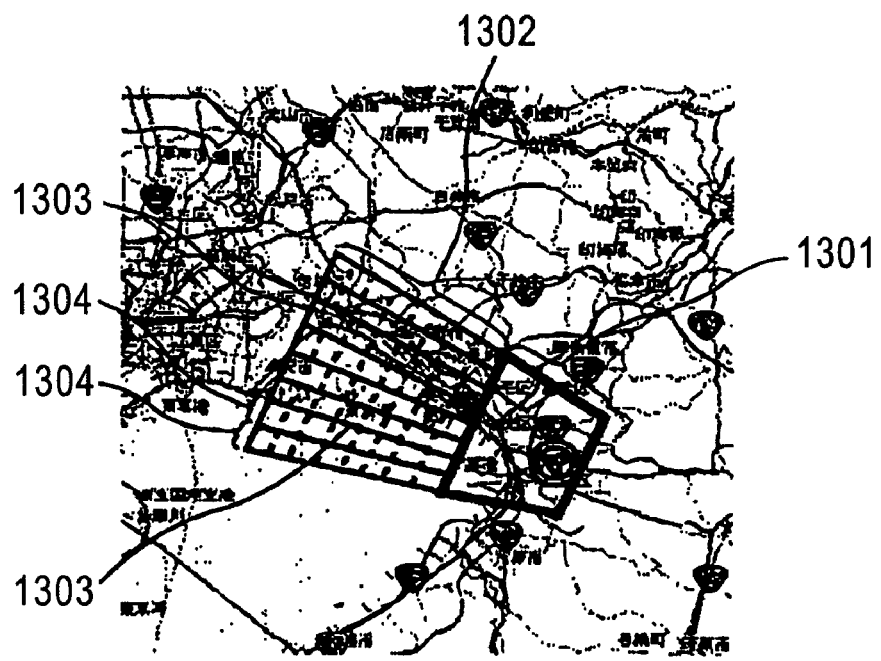
FIGS. 13A and 13B illustrate blocks for evaluation defined in yet another embodiment of the present invention.
Figure 13B:
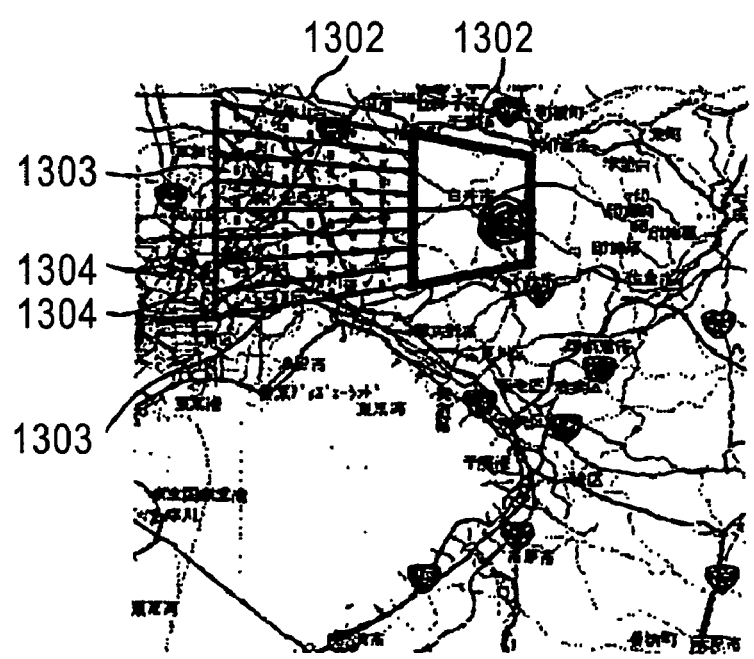

As shown in FIGS. 13A and 13B, the navigation-image generating unit 105 defines an area 1302 for evaluation by extending a map display area 1301 in the traveling direction. Then, the area 1302 is divided into viewing angle ranges 1304 (defined by solid lines in the drawings), and each viewing angle range 1304 is then divided into the blocks 1303 for evaluation (defined by solid lines and dotted lines in the drawings) for every predetermined interval along the traveling direction. The viewing angle is measured from a viewpoint for generating a bird's-eye view image. The blocks 1303 preferably have the same dimensions.

After act S1206, in act S1208, the navigation-image generating unit 105 calculates the total (the total number of building symbols) of the evaluated values of the blocks 1303 for each viewing angle range 1304.

Then, in act S1210, the navigation-image generating unit 105 selects viewing angle ranges 1304 that have the total evaluated values over a threshold Tha, and selects a city-light size for each of the selected viewing angle ranges 1304 in response to each total evaluated value. This city-light size increases as the total evaluated value increases.

Then, in act S1212, for each of the viewing angle ranges 1304 that have the total evaluated values over the threshold Tha, the navigation-image generating unit 105 selects a block 1303 belonging to the viewing angle range 1304, having an evaluated value over a threshold Thb (<Tha), and being closest to the map display area 1301, and then selects a drawing color for city lights in the viewing angle range 1304 in response to the position of this selected block 1303. In this embodiment, the closer to the map display area 1301 the selected block 1303 is, the deeper the drawing color is (for example, red). The more distant from the map display area 1301 the selected block 1303 is, the brighter the drawing color is (for example, lemon yellow). The navigation-image generating unit 105 selects a default drawing color (for example, white) of city light for the viewing angle ranges 1304 that have the total evaluated values over a threshold Tha but does not include any block 1303 having an evaluated value over the threshold Thb.

Then, in act S1214, the navigation-image generating unit 105 draws the predetermined nighttime background image 1111 on the upper portion of the map-image drawing area 1110, as in the third embodiment. Then, in act S1216, the navigation-image generating unit 105 draws the city light image 1112 on the lower edge of the nighttime background image 1111. The lower edge represents the horizon including the water horizon. The drawing color and the size of the city light image 1112 change from portion to portion of the lower edge. The portions correspond to the individual viewing angle ranges 1304. The navigation-image generating unit 105 draws a seamless city light image 1112 across these portions of the lower edge of the nighttime background image 1111.

Then, in act S1218, the navigation-image generating unit 105 draws a map image of the map display area through the map-drawing process, as in the first and the second embodiments; transforms coordinates of this map image to generate a bird's-eye view image, as shown in FIG. 9B; and disposes the bird's-eye view image 1113 on the lower portion of the map-image drawing area to complete the map image. Then, the process goes back to act S1202.

Figure 14A:
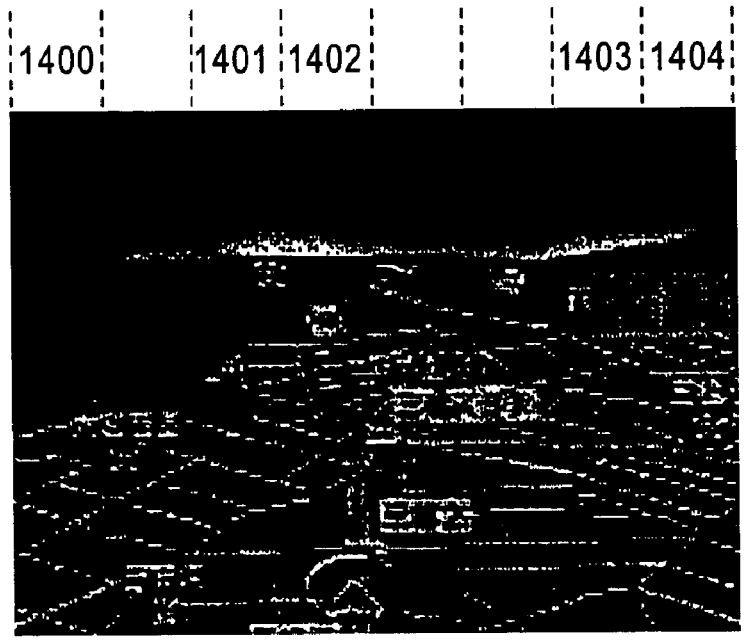
FIGS. 14A and 14B illustrate typical map images according to yet another embodiment of the present invention.
Figure 14B:
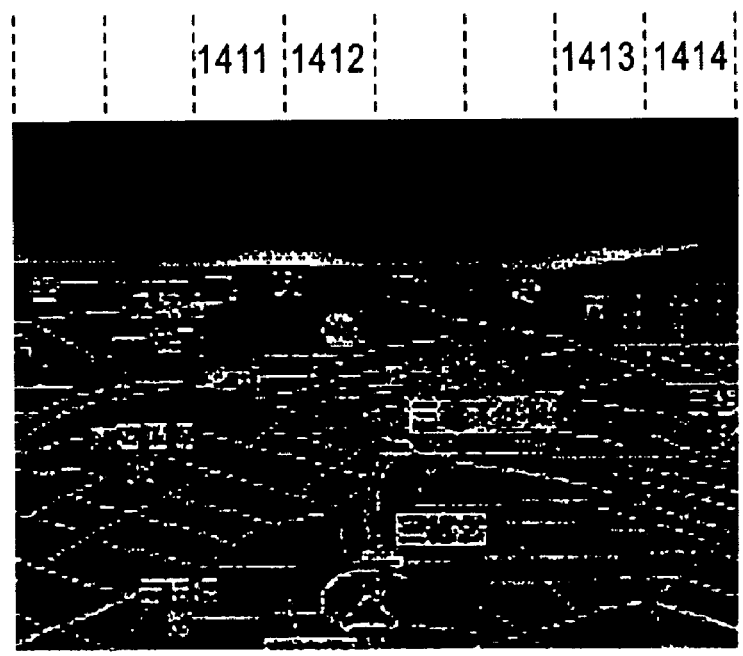

According to the map-drawing process in the fourth embodiment, as shown in FIGS. 14A and 14B, city lights appearing on the horizon including the water horizon can be displayed suitably for individual portions (corresponding to the individual viewing angle ranges 1304) of the horizon in response to the sizes and the locations of towns in individual regions that correspond to the individual portions of the horizon and that extend from the map display area in the traveling direction. The sizes of towns are estimated from the number of building symbols.

When the map display area is defined as shown in FIG. 13A, no town is presumed to exist in regions corresponding to a portion 1400 representing the sea because the regions do not include any building symbol. Thus, a navigation image can be displayed so that city lights do not appear in the portion 1400, as shown in FIG. 14A. Moreover, large towns are presumed to exist in regions corresponding to portions 1401, 1402, 1403, 1404, 1411, 1412, 1413, and 1414 because these regions include a large number of building symbols. Thus, large-size city lights can be displayed for these portions, and the city lights can be displayed in a deep color for portions that are close to regions having a high building density, as shown in FIGS. 14A and 14B.

According to the fourth embodiment, a user can recognize the existence of towns in distant regions extending from the map display area in the traveling direction, the sizes of these towns, and the distance from the current position to the towns, with reference to the map image.

In the fourth embodiment, the navigation-image generating unit 105 may select a specific drawing color for a viewing angle range 1304 including a block 1303 through which the recommended route extends. Moreover, in the fourth embodiment, the navigation-image generating unit 105 may calculate the number of icon symbols or the density of roads, instead of the number of building symbols, in each block 1303 based on the map master data to use these calculated values as an evaluated value for the block 1303, in act S1206 of FIG. 12.

Moreover, the fourth embodiment can be applied to the map-drawing process for a daytime map. In this case, as described above, an evaluated value for each block 1303 for evaluation and the total evaluated value for each viewing angle range 1304 are calculated. Then, the position of a block 1303 that has an evaluated value exceeding the predetermined threshold and that is closest to the map display area 1301 is selected for each viewing angle range 1304.

Then, for each viewing angle range 1304, the size of a building group symbol 1501 is determined depending on the total evaluated value of each viewing angle range 1304, and the definition of the building group symbol 1501 is determined depending on the position of the selected block 1303.

Figure 15:
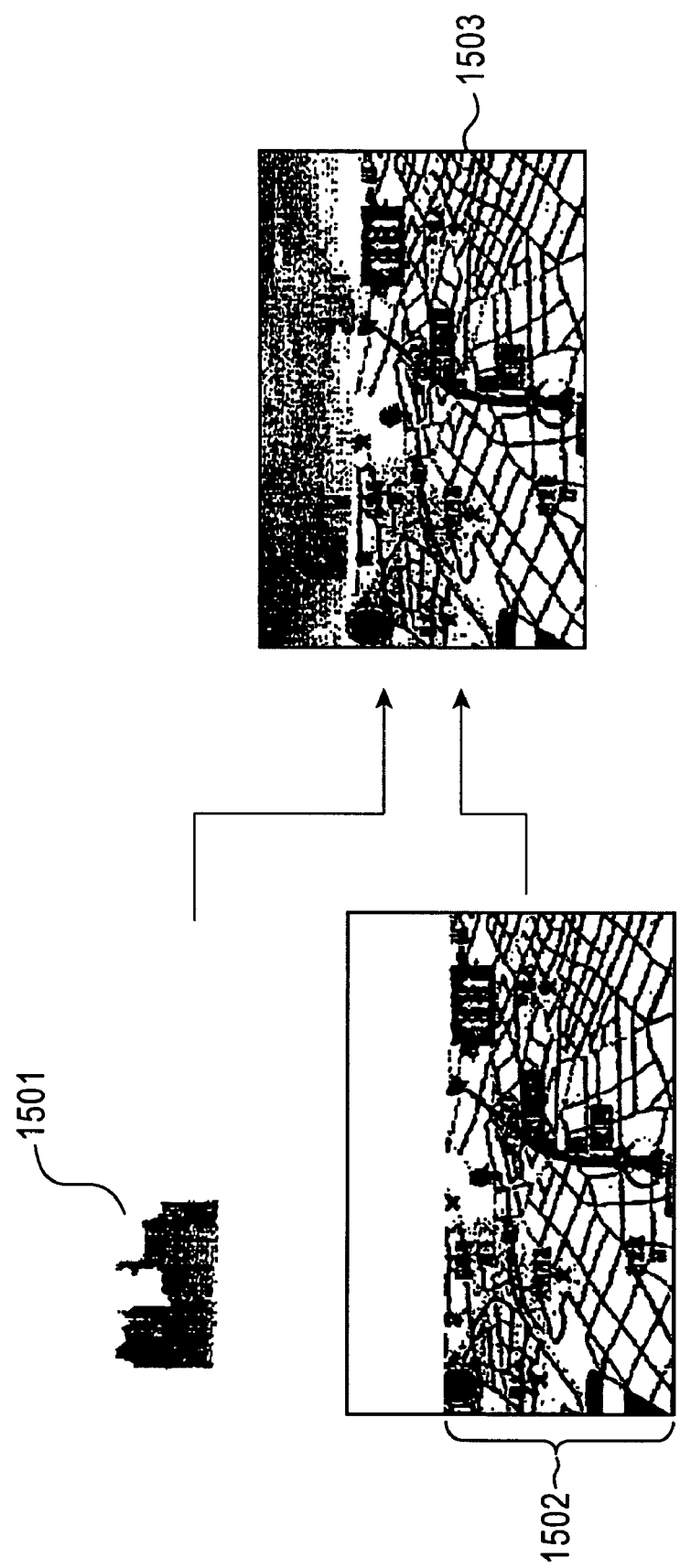
FIG. 15 illustrates a typical map image according to yet another embodiment of the present invention.

Then, as shown in FIG. 15, the building group symbol 1501 and a background image representing the sky are drawn on the upper edge, representing the horizon, of a bird's-eye view image 1502 to complete a map image 1503 representing towns at distant regions. The size and the definition of the building group symbol 1501 change from portion to portion of the upper edge. The portions correspond to the individual viewing angle ranges 1304.

When the map master data includes data on the altitudes of building symbols, the size of the building group symbol 1501 may be determined depending on the altitudes of building symbols within each viewing angle range 1304.

The current position mark and the recommended route symbol are drawn in FIGS. 13A, 13B, 14A, 14B, and 15 to facilitate the understanding of the relationship between the navigation images and the drawings when the main controlling unit 107 determines the map display area with reference to the current position. The navigation-image generating unit 105 separately draws the current position mark and the recommended route symbol in the drawings on the map image generated in the map-drawing process.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. A navigation apparatus for displaying a map that includes building symbols representing buildings, comprising:
   a map-drawing unit configured to draw a map of an area from map data and building symbols having predetermined shapes at a position corresponding to positions of buildings on the map at a selected map scale; and
   a displaying unit configured to display the drawn map,
   wherein, in a nighttime-map displaying mode, the map-drawing unit draws the entirety of each building symbol in a bright color to generate the map when the map scale exceeds a predetermined threshold and draws a part of each building symbol in a bright color to generate the map when the map scale does not exceed the predetermined threshold, and
   wherein, when the map scale does not exceed the predetermined threshold in the nighttime-map displaying mode, the map-drawing unit draws a portion of at least one building symbol with a lower brightness when the position of the at least one building symbol shifts to the top of the map.

2. The navigation apparatus of claim 1, wherein
   the map data includes a position data field representing at least one representative point in each building symbol, and
   the map-drawing unit is operable to draw a bright symbol on a position indicated by the position data field when the map scale does not exceed the predetermined threshold in a nighttime-map displaying mode.

3. The navigation apparatus of claim 2, wherein the representative point in the building symbol is at least one vertex of the shape of the building symbol shape.

4. The navigation apparatus of claim 2, wherein the representative point in the building symbol is the central point or the center of mass of the shape of the building symbol.

5. The navigation apparatus of claim 1, wherein the map-drawing unit is operable to calculate a position of at least one representative point in each building symbol and draw a bright symbol on the calculated position when the map scale does not exceed the predetermined threshold in a nighttime-map displaying mode.

6. The navigation apparatus of claim 5, wherein the representative point in the building symbol is at least one vertex of the shape of the building.

7. The navigation apparatus of claim 5, wherein the representative point in the building symbol is the central point or the center of mass of the shape of the building.

8. The navigation apparatus of claim 1, wherein the map-drawing unit is configured to draw the part of the building symbol after a reduction in the area ratio of the part to the entirety when the map scale does not exceed the predetermined threshold in a nighttime-map displaying mode.

9. The navigation apparatus of claim 1, wherein as the number of building symbols included in individual predetermined regions in both the map and an associated area increases and when the map scale does not exceed the predetermined threshold in a nighttime-map displaying mode, the map-drawing unit is configured to draw the part of the building symbol having a smaller ratio of the area of the part to the area of the entirety.

10. A navigation apparatus for displaying a map with reference to map data, comprising:
- a map-drawing unit configured to draw a bird's-eye view obtained by virtually viewing a display area on the map from a viewpoint in midair above a predetermined reference position in the display area;
- a building-density calculating unit configured to estimate building densities of individual viewing angle regions obtained by dividing an area extending from the display area in the viewing direction of the display area in a nighttime-map displaying mode;
- a map-image generating unit configured to adjust emphasis levels for displaying the respective viewing angle regions and draw a night-sky image representing city lights at the emphasis levels on portions of the horizon to generate a map image in a nighttime-map displaying mode, the emphasis levels increasing as the estimated building densities of the respective viewing angle regions increase and the portions corresponding to the respective viewing angle regions; and
- a displaying unit operable to display a generated map image.

11. The navigation apparatus of claim 1, wherein the map-drawing unit is operable to draw a bird's-eye view obtained by virtually viewing an area covered by the map from a viewpoint in midair.

12. The navigation apparatus of claim 1, wherein the map-drawing unit is operable to draw a building symbol with a lower brightness when the position of the building symbol shifts to the top of the map and when the map scale does not exceed the predetermined threshold in a nighttime-map displaying mode.

13. The navigation apparatus of claim 1, wherein the map-drawing unit is operable to draw a portion of a building symbol at a decreasing size when the position of the building symbol shifts to the top of the map in a nighttime-map displaying mode.

14. The navigation apparatus of claim 1, wherein the map-drawing unit is operable to draw a building symbol at a decreasing size when the position of the building symbol shifts to the top of the map in a nighttime-map displaying mode.

15. A navigation apparatus for displaying a map, comprising:
- a map-drawing unit configured to draw a bird's-eye view of a display area on the map;
- a land-area calculating unit configured to calculate a land area of a boundary corresponding to the horizon of the bird's-eye view in a nighttime-map displaying mode;
- a map-image generating unit configured to draw a night-sky image representing city lights on a land area; and
- a displaying unit configured to display a generated map image,
- wherein, when the map scale does not exceed the predetermined threshold in the nighttime-map displaying mode, the map-drawing unit draws a portion of at least one building symbol with a lower brightness when the position of the at least one building symbol shifts to the top of the map.

* * * * *